US008959405B2

(12) United States Patent
Ikawa et al.

(10) Patent No.: US 8,959,405 B2
(45) Date of Patent: Feb. 17, 2015

(54) SIGNAL TRANSMISSION DEVICE FOR ELEVATOR

(75) Inventors: Masahiko Ikawa, Tokyo (JP); Kazunori Washio, Tokyo (JP); Masashi Kitayama, Tokyo (JP); Takuya Ishioka, Tokyo (JP); Hiroyuki Kumazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 656 days.

(21) Appl. No.: 13/201,474

(22) PCT Filed: Feb. 8, 2010

(86) PCT No.: PCT/JP2010/000746
§ 371 (c)(1),
(2), (4) Date: Aug. 15, 2011

(87) PCT Pub. No.: WO2010/109748
PCT Pub. Date: Sep. 30, 2010

(65) Prior Publication Data
US 2011/0302466 A1 Dec. 8, 2011

(30) Foreign Application Priority Data
Mar. 25, 2009 (JP) ................................. 2009-074276

(51) Int. Cl.
*G06F 11/00* (2006.01)
*B66B 1/34* (2006.01)
(Continued)

(52) U.S. Cl.
CPC ................. *B66B 1/34* (2013.01); *B66B 1/3446* (2013.01); *B66B 5/0031* (2013.01); *H04L 1/0045* (2013.01); *H04L 1/0061* (2013.01); *H04L 1/08* (2013.01)
USPC ...................................................... 714/704

(58) Field of Classification Search
CPC ........ G07C 5/008; H04L 1/0061; B66B 1/34; B66B 1/3446; B66B 5/0031
USPC ................... 714/704, 52, 758, 719, 819, 799, 714/E11.004, 1, 37, 39, 47.1; 187/247, 316, 187/317, 277
See application file for complete search history.

(56) References Cited

U.S. PATENT DOCUMENTS

| 4,422,067 | A | * | 12/1983 | Clark et al. | 340/508 |
| 6,173,814 | B1 | * | 1/2001 | Herkel et al. | 187/288 |
| 8,598,991 | B2 | * | 12/2013 | Fair et al. | 340/12.32 |
| 2007/0109996 | A1 | | 5/2007 | Jung | |

FOREIGN PATENT DOCUMENTS

| JP | 62 116035 | 5/1987 |
| JP | 4 103296 | 4/1992 |

(Continued)

OTHER PUBLICATIONS

International Search Report issued Apr. 27, 2010 in PCT/JP10/000746 filed Feb. 8, 2010.

*Primary Examiner* — Phung M Chung
(74) *Attorney, Agent, or Firm* — Oblon, Spivak, McClelland, Maier & Neustadt, L.L.P.

(57) ABSTRACT

Each of a master node and a slave node has a safety data processing unit and a high reliability communication unit. At the time of transmission, the safety data processing unit creates a safety data packet including data about safety and the high reliability communication unit creates a communication data packet including the safety data packet and transmits the communication data packet a predetermined number of times. At the time of reception, the high reliability communication unit acquires and outputs a safety data packet by determining one of one or more communication data packets having the same contents which it has received properly as an effective packet, and the safety data processing unit analyzes a state concerning the safety of a system on the basis of the data about safety acquired from the safety data packet.

14 Claims, 19 Drawing Sheets

(51) Int. Cl.
*B66B 5/00* (2006.01)
*H04L 1/00* (2006.01)
*H04L 1/08* (2006.01)

(56) References Cited

FOREIGN PATENT DOCUMENTS

| JP | 5 114987 | 5/1993 |
| JP | 5 160815 | 6/1993 |
| JP | 7 23030 | 1/1995 |
| JP | 10 190634 | 7/1998 |
| JP | 2002 179350 | 6/2002 |
| JP | 2002 538061 | 11/2002 |
| JP | 2004 7799 | 1/2004 |
| JP | 2004 48474 | 2/2004 |
| JP | 2005 502567 | 1/2005 |
| JP | 2006 14561 | 1/2006 |
| JP | 2007 104423 | 4/2007 |
| JP | 2007 143146 | 6/2007 |

\* cited by examiner

SIGNAL TRANSMISSION DEVICE FOR ELEVATOR

FIELD OF THE INVENTION

The present invention relates to a signal transmission device for use in a safety system for an elevator device or the like. More particularly, it relates to a signal transmission device that carries out data transmission of data associated with the safety of a system between a master node and a slave node.

BACKGROUND OF THE INVENTION

A conventional signal transmission device that divides transmission data into data about the safety of an elevator and other data, and creates a packet which is a combination of plural pieces of data including at least the data about safety and then transmits the packet is disclosed (for example, refer to patent reference 1). This device adds a CRC (Cyclic Redundancy Code) to the above-mentioned data about safety (referred to as the safety data from here on) to enable a receive side to detect a transmission error by using the CRC and make a request for retransmission of the transmit side when detecting a transmission error, thereby being able to transmit the safety data about the safety of the elevator certainly and promptly.

However, in such a conventional signal transmission device as disclosed by patent reference 1, a CPU carries out a process of retransmitting the safety data in response to the request sent thereto from the receive side. This CPU serves also as a unit for handling the safety data which are received. A problem is therefore that when a delay time permitted in the transmission of the safety data is short, such as when the transmission time interval of the safety data is short, the next-time transmission of the safety data may be delayed because of the processing load and this delay may exceed the permissible delay time if the CPU which also handles the safety data performs the retransmitting process in order to transmit the safety data certainly.

The present invention is made in order to solve the above-mentioned problem, and it is therefore an object of the present invention to provide a signal transmission device for elevator that can transmit safety data promptly by carrying out continuous transmission of the safety data and a process of handling the safety data independently of each other.

RELATED ART DOCUMENT

Patent Reference

Patent reference 1: JP,2004-48474,A

SUMMARY OF THE INVENTION

In accordance with the present invention, there is provided a signal transmission device for elevator provided with a slave node to which information showing a state of a switch or a sensor concerning control of safety of an elevator is inputted, and a master node for controlling an operation of the above-mentioned elevator, and having a structure in which one of the above-mentioned slave node and the above-mentioned master node transmits data about the safety of the above-mentioned elevator via a communication network and the other one of the slave node and the master node receives the data via the communication network, in which each of the slave node and the master node includes a safety data processing unit and a communication processing unit which operate in parallel with each other on different pieces of hardware, and the safety data processing unit acquires the data about the safety at fixed time intervals and also adds an error detecting code which can achieve a predetermined rate of overlooking errors to creates first data and output this first data to the communication processing unit, and, at a time of reception, checks whether or not the error detecting code of the first data outputted from the communication processing unit is correct and analyzes a state concerning the safety of the system on the basis of the data about the safety acquired from the first data in which no error is detected, and, at a time of transmission, the communication processing unit creates second data including the first data outputted from the safety data processing unit, and transmits the second data via the communication network a predetermined number of times, and, at the time of reception, when receiving one or more pieces of the second data having the same contents properly, determines one of the one or more pieces of the second data as effective second data, and outputs the first data which the communication processing unit acquires from the second data to the safety data processing unit, and in which the safety data processing unit of the master node stops the elevator when detecting an error from the error detecting code of the first data inputted from the communication processing unit or when the master node cannot receive the first data during a certain period of time.

In accordance with the present invention, in the signal transmission device for elevator provided with the slave node to which information showing a state of a switch or a sensor concerning control of safety of an elevator is inputted, and the master node for controlling an operation of the above-mentioned elevator, and having a structure in which one of the above-mentioned slave node and the above-mentioned master node transmits data about the safety of the above-mentioned elevator via a communication network and the other one of the slave node and the master node receives the data via the communication network, each of the slave node and the master node includes the safety data processing unit and the communication processing unit which operate in parallel with each other on different pieces of hardware, and the safety data processing unit acquires the data about the safety at fixed time intervals and also adds an error detecting code which can achieve a predetermined rate of overlooking errors to creates first data and output this first data to the communication processing unit, and, at a time of reception, checks whether or not the error detecting code of the first data outputted from the communication processing unit is correct and analyzes a state concerning the safety of the system on the basis of the data about the safety acquired from the first data in which no error is detected, and, at a time of transmission, the communication processing unit creates second data including the first data outputted from the safety data processing unit, and transmits the second data via the communication network the predetermined number of times, and, at the time of reception, when receiving one or more pieces of the second data having the same contents properly, determines one of the one or more pieces of the second data as effective second data, and outputs the first data which the communication processing unit acquires from the second data to the safety data processing unit, and the safety data processing unit of the master node stops the elevator when detecting an error from the error detecting code of the first data inputted from the communication processing unit or when the master node cannot receive the first data during a certain period of time. Because the signal transmission device is constructed as mentioned above, the signal transmission device can carry out continuous transmission of the safety data independently of a process of handling the safety data, and can carry out the continuous transmission process of continuously transmitting the safety data at shorter time intervals as compared with conventional signal transmission devices. Therefore, there is provided an unprecedented, remarkable advantage of being able to transmit the safety data certainly even if the safety data need to have a shorter permissible response time.

EMBODIMENTS OF THE INVENTION

Hereafter, in order to explain this invention in greater detail, the preferred embodiments of the present invention will be described with reference to the accompanying drawings.
Embodiment 1.

Hereinafter, an embodiment will be described by taking an elevator as an example of application of a signal transmission device in accordance with the present invention.

Figure 1:
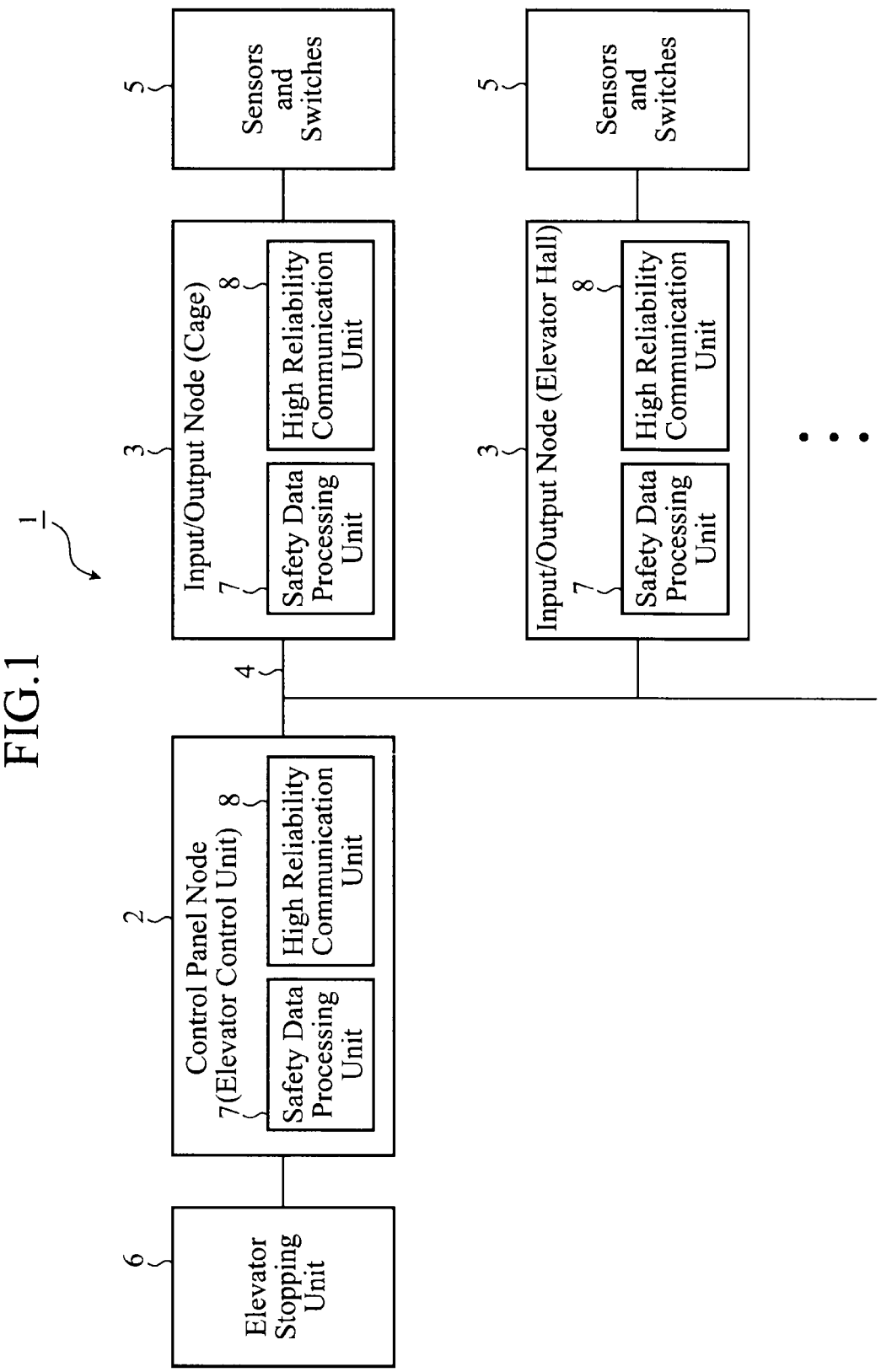
FIG. 1 is a block diagram showing the structure of a signal transmission device for elevator in accordance with Embodiment 1 of the present invention.

FIG. 1 is a block diagram showing the structure of a signal transmission device for elevator in accordance with Embodiment 1 of the present invention. As shown in FIG. 1, the signal transmission device 1 for elevator in accordance with Embodiment 1 is provided with a master node (control panel node) 2 disposed in an elevator control unit, at least a slave node (input/output node) 3 disposed in each of a hoistway, elevator halls, and a cage, a safety network (a communication network) 4 for connecting between the nodes 2 and 3 via communications, sensors and switches 5, and an elevator stopping unit 6. The signal transmission device 1 for elevator in accordance with Embodiment 1 carries out transmission of data about the safety of the elevator (referred to as safety data from here on) between the master node 2 and the slave node 3 via the safety network 4. The safety network 4 is comprised of a cable or radio communication network which is a medium for transmitting the safety data.

The sensors and switches 5 are disposed in the hoistway, the elevator halls, and the cage. In this case, the sensors and switches include an emergency stop switch, a gate switch, a door zone sensor, a releveling (releveling) zone sensor, a terminal switch, a final limit switch, and sensors and switches showing the state of the elevator including the state of a speed regulator encoder and the state of a loop wheel machine encoder. Generally, each of sensor state signals and switch state signals which are outputted by the sensors and switches 5 is shown by numerical data which are acquired by digitizing either the on or off state or the analog quantity of an input signal.

Various connection method of connecting the sensors and the switches to the elevator system, and various input method of inputting the signals to the elevator system can be considered according to the elevator system. The elevator stopping unit 6 stops the operation of the elevator according to control by the master node of the elevator control unit, and is comprised of a brake, a driving unit for driving the brake, and a unit for blocking the driving force of a loop wheel machine.

Each of the nodes 2 and 3 is provided with a safety data processing unit 7 and a high reliability communication unit (a communication processing unit) 8. The safety data processing unit 7 is a component for handling the safety data independently of a process of transmitting the safety data. In this case, the safety data are concerned with the safety of passengers in the elevator or the safety of elevator maintenance engineers, and are expressed as digital data of the information about states having a possibility of leading to an accident of the elevator according to the states, these states being included in those of the sensor and switches which construct the sensors and switches 5. More specifically, the safety data are data in which the soundness of the input data and that of a process of generating the input data are verified, and it can be recognized that when the safety data have an abnormal value, a dangerous state in which the safety of passengers in the elevator or the safety of elevator maintenance engineer is endangered has occurred.

The high reliability communication unit 8 is a component for carrying out a process of transmitting and receiving the safety data, and has a function associated with the reliability of the communications of the safety data. The high reliability communication unit 8 performs a transmission process of transmitting the safety data between the nodes independently of the process of handling the safety data. As the transmission process, the safety data having the same contents are continuously transmitted a predetermined number of times (this transmission is referred to as continuous transmission from here on). In order to perform only the transmission process independently of the process of handling the safety data, the high reliability communication unit 8 can shorten the continuous transmission interval length as compared with a case in which a CPU which also serves as a unit for performing the safety data handling process carries out the transmission process. Because the signal transmission device thus causes hardware disposed independently of the CPU which carries out the safety data handling process to carry out the continuous transmission process to secure the reliability of data, there is provided an advantage of being able to implement reliable transmission of data even if the data are the safety data which need to have a shorter permissible response time.

Figure 2:
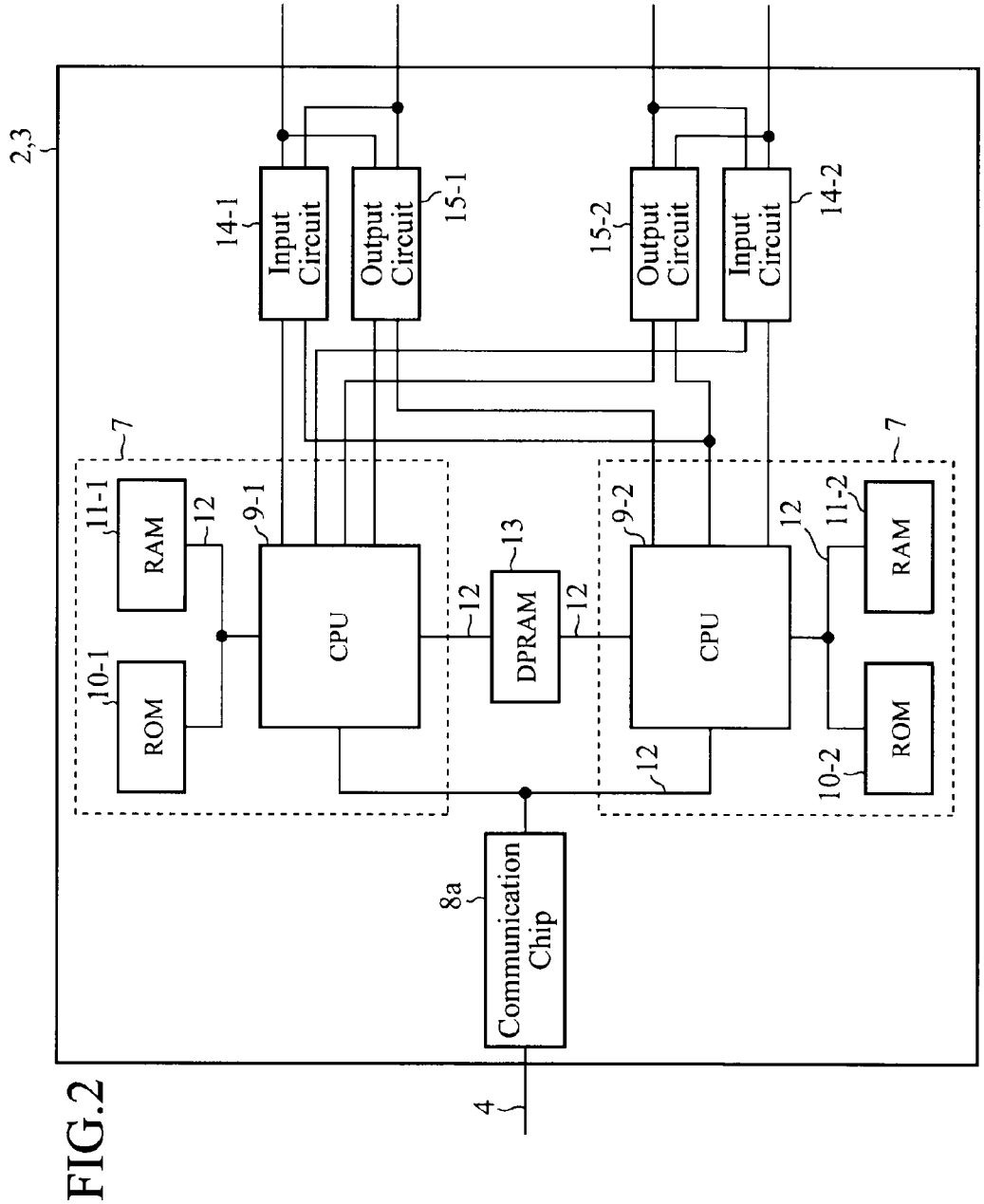
FIG. 2 is a view showing the hardware configuration of a node in the signal transmission device for elevator in accordance with Embodiment 1.

FIG. 2 is a view showing the hardware configuration of each node in the signal transmission device for elevator in accordance with Embodiment 1, and shows a case in which two configurations of hardware which is the safety data processing unit 7 are provided. As shown in FIG. 2, each of the nodes 2 and 3 is constructed in such a way that a communication chip 8*a*, a CPU 9-1 (and a CPU 9-2), a ROM 10-1 for storing a program for safety data handling and so on (and a ROM 10-2), a RAM 11-1 (and a RAM 11-2), a DPRAM 13, input circuits 14-1 and 14-2, and output circuits 15-1 and 15-2 are connected to one another via a bus 12.

Each safety data processing unit 7 is comprised of the CPU 9-1 (the CPU 9-2), the ROM 10-1 (the ROM 10-2), and the RAM 11-1 (the RAM 11-2), and is implemented as a unit in which hardware and software work in cooperation with each other by causing the CPU 9-1 (the CPU 9-2) to execute the program for safety data handling in the ROM 10-1 (the ROM 10-2). The DPRAM 13 is a shared memory which is used at the time of exchanging data between the CPUs 9-1 and 9-2 of the two safety data processing units 7.

The communication chip 8*a* constructs the high reliability communication unit 8 which performs the transmission process of transmitting the safety data via the safety network 4, and has an arithmetic operation unit for performing an arithmetic process concerning the transmission process independently of the CPUs 9-1 and 9-1 of the safety data processing unit 7. While the safety data processing unit 7 acquires and handles the safety data which the communication chip 8*a* has received via the bus 12, the safety data processing unit exchanges data with a device disposed behind the safety data processing unit and connected thereto via one of the input circuits 14-1 and 14-2 and the output circuits 15-1 and 15-2.

Thus, in each of the nodes 2 and 3 in accordance with this Embodiment 1, the safety data processing unit 7 and the high reliability communication unit 8 have the different arithmetic operation units, and these units perform the process of handling the safety data and the continuous transmission process of continuously transmitting the safety data independently of each other. Therefore, because the processing load is not concentrated, the signal transmission device can carry out the continuous transmission process of continuously transmitting the safety data at shorter time intervals as compared with conventional signal transmission devices, and can transmit the safety data certainly even if the safety data need to have a shorter permissible response time. More specifically, by carrying out the continuous transmission process which secures the reliability of data by using the hardware disposed independently of the CPUs which carry out the safety data handling process, the signal transmission device can implement reliable transmission of the safety data even if the safety data need to have a shorter permissible response time.

Figure 3:
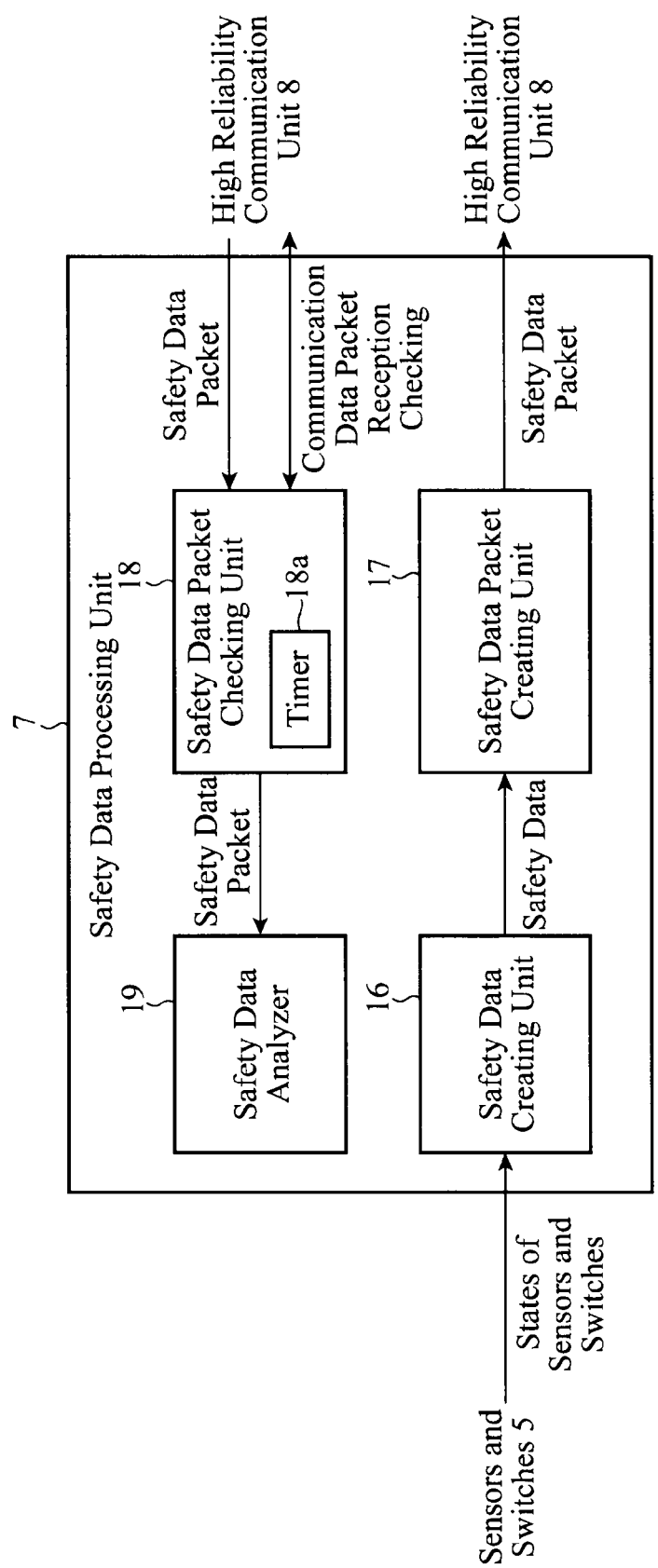
FIG. 3 is a block diagram showing the structure of a safety data processing unit shown in FIG. 1.

FIG. 3 is a block diagram showing the structure of the safety data processing unit shown in FIG. 1. As shown in FIG. 3, the safety data processing unit 7 is provided with a safety data creating unit 16, a safety data packet creating unit (a first data creating unit) 17, a safety data packet checking unit (a first data checking unit) 18, and a safety data analyzer (an analyzer) 19. The safety data creating unit 16 creates safety data from the pieces of state information about the states of sensors and switches (the sensors and switches having a possibility of leading to an accident of the elevator according to their states) which are inputted from the sensors and switches 5. The safety data creating unit 16 creates safety data by digitizing the pieces of state information about the states of the plurality of sensors and switches in a predetermined format which is defined in advance. The safety data packet creating unit 17 adds a running number and an error detecting code to the safety data created by the safety data creating unit 16 to create a safety data packet.

While the safety data packet checking unit 18 checks to see whether a communication data packet has been received by the high reliability communication unit 8, the safety data packet checking unit checks the error detecting code and the running number of a safety data packet which is received by the high reliability communication unit 8 to detect an error in a received data packet or a lack of the data packet. The safety data analyzer 19 deciphers the safety data of the safety data packet which has been determined to be properly received by the safety data packet checking unit 18 to analyze the state concerning the safety of the elevator, and performs determination of whether or not the elevator is dangerous or the like according to the analysis result.

By providing multiple main operational circuits each including a CPU, a ROM and a RAM, and comparing their input and output data and calculation results with one another, the soundness of the safety data handled by the safety data processing unit and the soundness of the equipment are diagnosed.

The safety implemented by the safety data processing unit is shown by a value (a rate of overlooking failures) showing the number of occurrences per hour of a state in which the elevator cannot be stopped at the time when it should be stopped (an unsafe failure) when no error cannot be detected in the data which have been communicated even though the data have an error, when any failure cannot be detected even though the equipment which performs the safety data handling process has a failure, or the like.

A value which a certain safety system must satisfy as the rate of overlooking failures is shown in the international safety standard IEC61508. For example, in order to satisfy a safety integrity level referred to as SIL3 and applied to a machine tool for FA and an elevator, such a safety system needs to achieve less than $10^{-7}$/h (once per 10,000,000 hours) as the rate of overlooking failures.

Thus, in order to improve the safety, the safety data processing unit carries out a high-load process, such as self-diagnostics of equipment or detection of errors in data. The error detecting code which is added to the safety data by the above-mentioned safety data processing unit is designed to achieve this rate of overlooking failures.

The rate of overlooking failures Λ per unit of time is calculated according to the following equation.

$$\Lambda = 3600 \times R(p) \times v \times (m-1)$$

where v is the number of messages per second, and m is the number of connected units including the transmission unit.

R(p) shows a probability of transmission error undetection per one message at the time when the bit error rate of the transmission line is expressed as p, and is usually calculated according to the following equation.

$$R(p) = \Sigma(e = d \text{ to } n)\{A(n,e) \times p^e \times (1-p)^{(n-e)}\}$$

Σ(e=d to n) is the total sum of the computation expression in the following brace for the value of e ranging from d to n. In this case, d shows a minimum Hamming distance of the error detecting code.

A(n, e) shows a binomial computation expression, and is given by the following computation expression.

$$A(n,e) = n!\times e!/(n-e)!$$

n shows a message length and n! shows the factorial of n. p^e shows the e-th power of p.

Furthermore, as R(p), a value taking into consideration the characteristics of the error detecting code, such as a CRC, can be used alternatively. At this time, by performing the calculations using, as the bit error rate of the communication processing unit, a sufficiently-bad value (for example, $1.0 \times 10^{-2}$), instead of the actual value, the high safety can be guaranteed at all times even in a case in which the quality of the transmission line cannot be guaranteed.

Figure 4:
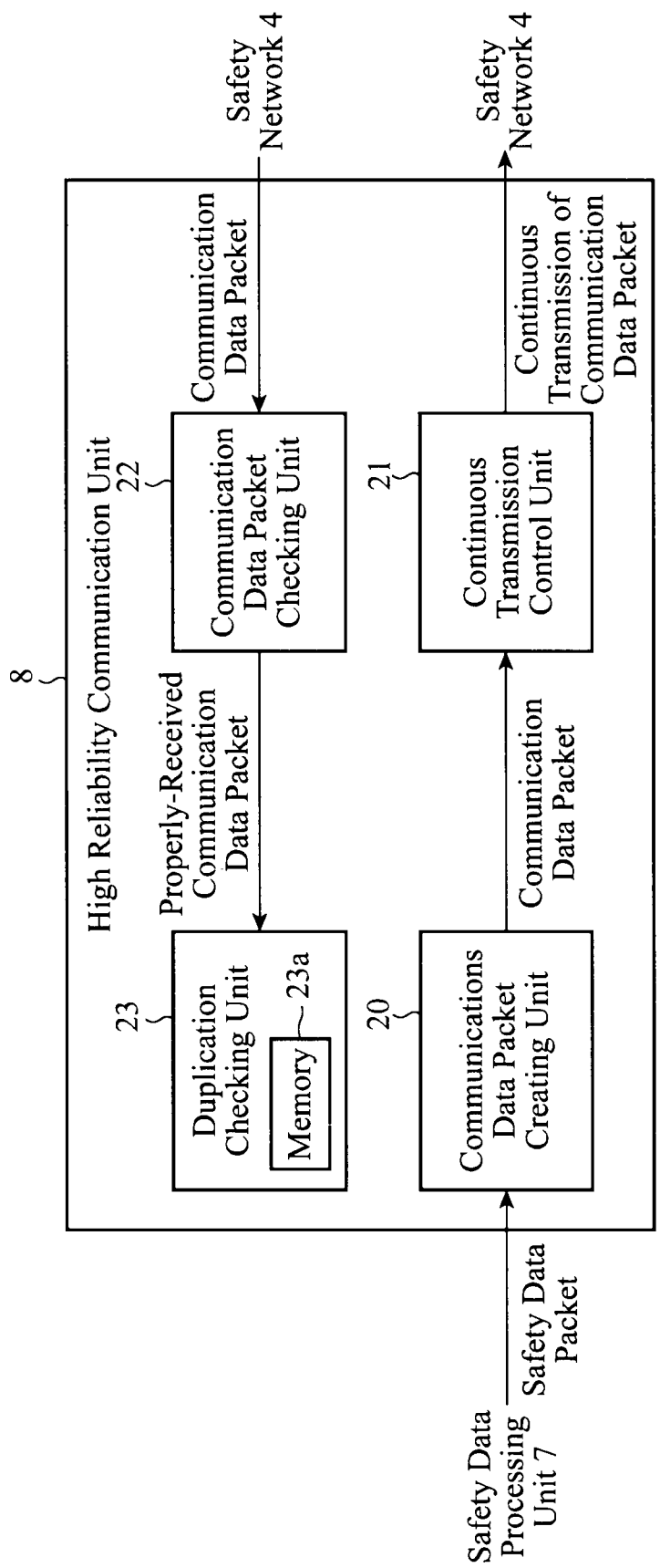
FIG. 4 is a block diagram showing the structure of a high reliability communication unit shown in FIG. 1.

FIG. 4 is a block diagram showing the structure of the high reliability communication unit shown in FIG. 1.

As shown in FIG. 4, the high reliability communication unit 8 is provided with a communication data packet creating unit (a second data creating unit) 20, a continuous transmission control unit 21, a communication data packet checking unit (a second data checking unit) 22, and a duplication checking unit 23. In order to secure the reliability of communication data transmitted between the master node 2 of the elevator control unit and the slave node 3, the communication data packet creating unit 20 adds a packet number and an error detecting code to the safety data packet inputted thereto from the safety data processing unit 7 to create a communication data packet. The continuous transmission control unit 21 carries out continuous transmission of the communication data packet created by the communication data packet creating unit 20 via the safety network 4 a predetermined number of times.

When the communication data packet checking unit 22 checks the error detecting code of the communication data packet received via the safety network 4 and then detects an error, the communication data packet checking unit discards this received data packet. When the communication data packet to which the same packet number is added has been normally received at least once, the duplication checking unit 23 determines that only one of these communication data packets is effective, or when only one communication data packet has been properly received, the duplication checking unit determines that the communication data packet is effective.

Furthermore, the reliability concerning the communication process in the signal transmission device 1 for elevator in accordance with Embodiment 1 is an indicator showing the probability that the equipment operates properly. For the elevator, the reliability is shown by the number of occurrences per unit of time of emergency stop resulting from detection of a failure occurring in the equipment or detection of a communication error.

Figure 5:
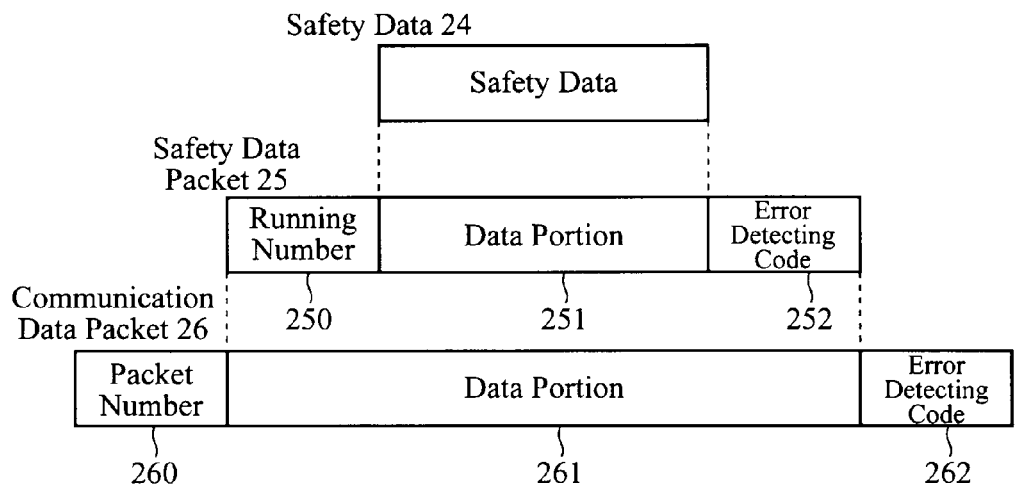
FIG. 5 is a view showing the structure of a communication data packet exchanged in the signal transmission device for elevator in accordance with Embodiment 1.

FIG. 5 is a view showing the structure of a communication data packet exchanged in the signal transmission device for elevator in accordance with Embodiment 1. As shown in FIG. 5, the safety data 24 created by the safety data creating unit 16 are stored in a data portion 251 by the safety data packet creating unit 17, and a running number 250 and an error detecting code 252 are added to the safety data and a safety data packet (first data) 25 is created. Furthermore, the communication data packet creating unit 20 of the high reliability communication unit 8 stores the safety data packet 25 in a data portion 261 to create a communication data packet (second data) 26 to which a packet number 260 and an error detecting code 262 are added.

Next, the operation of the signal transmission device will be explained.

(1) The Operation of the Safety Data Processing Unit 7 of the Slave Node 3

Figure 6:
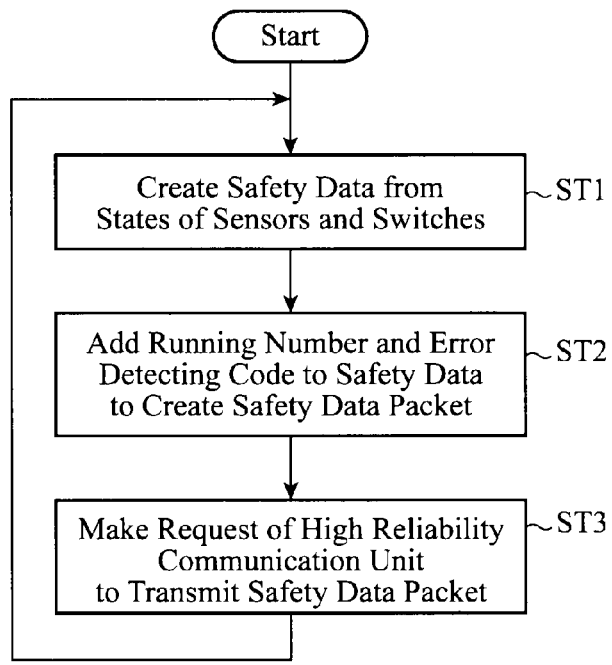
FIG. 6 is a flow chart showing a flow of the operation performed by the safety data processing unit of a slave node in accordance with Embodiment 1.

FIG. 6 is a flow chart showing a flow of the operation performed by the safety data processing unit of the slave node in accordance with Embodiment 1. First, the safety data creating unit 16 of the slave node 3 creates safety data from the pieces of state information about the states of the sensors and switches (the sensor and switches having a possibility of leading to an accident of the elevator according to their states) inputted from the sensors and switches 5 (step ST1). When receiving the safety data from the safety data creating unit 16, the safety data packet creating unit 17 adds a running number and an error detecting code to the safety data to create a safety data packet (step ST2).

In this Embodiment 1, a CRC is used as the error detecting code, and a value which is sequentially incremented by one from 0 for each transmission (when the value exceeds its maximum, the value is returned to 0) is used as the running number.

After creating the safety data packet, the safety data packet creating unit 17 makes a request of the high reliability communication unit 8 to transmit the safety data packet (step ST3). After the safety data packet creating unit completes the transmission request, the safety data processing unit 7 of the slave node 3 returns to step ST1 and then repeats the same process.

Furthermore, in the above-mentioned explanation, although the case in which the safety data processing unit 7 of the slave node 3 creates a safety data packet to be transmitted to the master node 2 and makes a request to transmit the safety data packet is shown, the signal transmission device carries out the process according to the same procedure also when the safety data processing unit 7 of the master node 2 creates a safety data packet to be transmitted to the slave node 3 and makes a request to transmit the safety data packet.

(2) The Operation of the Safety Data Processing Unit 7 of the Master Node 2

Figure 7:
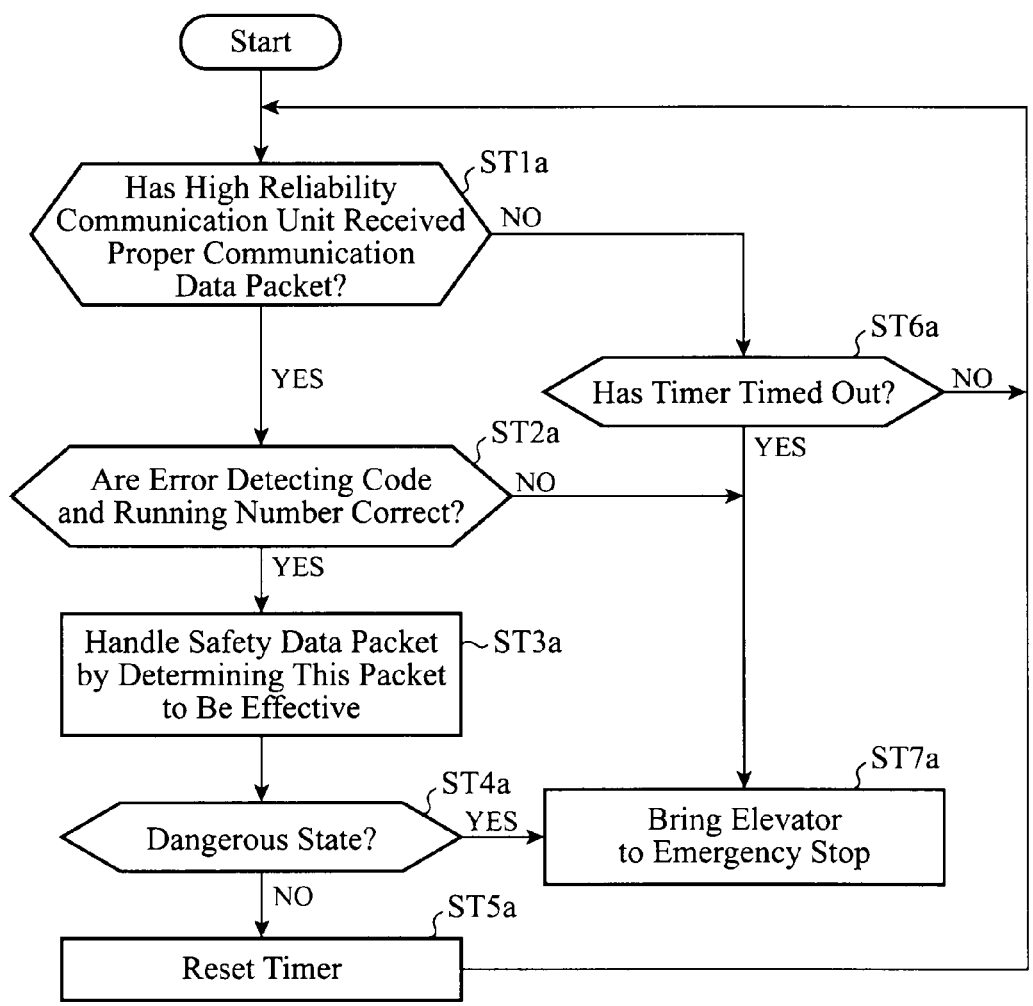
FIG. 7 is a flow chart showing a flow of the operation performed by the safety data processing unit of a master node in accordance with Embodiment 1.

FIG. 7 is a flow chart showing a flow of the operation performed by the safety data processing unit of the master node in accordance with Embodiment 1. First, while the safety data packet checking unit 18 of the master node 2 starts counting a timer 18a built therein for monitoring the receiving time interval of a communication data packet (in an initial state, the timer has a count of 0), the safety data packet checking unit checks whether the high reliability communication unit 8 of the master node 2 has received a communication data packet properly (step ST1*a*). Because a communication data packet in which an error has been detected is discarded in the high reliability communication unit 8, the safety data packet checking unit 18 can verify whether or not a communication data packet has been properly received by checking whether the received data packet is stored in a memory 23*a* in the high reliability communication unit 8. The safety data packet checking unit 18 carries out this checking by directly accessing to the memory 23*a* of the high reliability communication unit 8 or by providing an interface which causes the high reliability communication unit 8 to check the memory 23*a* in response to an inquiry from the safety data packet checking unit 18, and then return a reply.

When a proper communication data packet has been received (if YES in step ST1*a*), the safety data packet checking unit 18 accepts the communication data packet from the high reliability communication unit 8, and acquires the safety data packet from the data portion of the communication data packet. While the safety data packet checking unit 18 then carries out an error detection process by checking the error detecting code, the safety data packet checking unit checks if there is neither a lack nor duplication of a message from the running number (step ST2*a*).

When no error is detected through the checking of the error detecting code, and the running number is determined to be correct (if YES in step ST2*a*), the safety data packet checking unit 18 determines that the safety data packet acquired from the data portion of the communication data packet is effective, and outputs this safety data packet to the safety data analyzer 19 (step ST3*a*). The safety data analyzer 19 acquires the safety data from the data portion of the inputted safety data packet, and analyzes the safety data to determine whether or not the elevator is in a dangerous state (step ST4*a*).

At this time, when the elevator is not in a dangerous state (if NO in step ST4*a*), the safety data analyzer 19 notifies the safety data packet checking unit 18 to that effect. When receiving this notification, the safety data packet checking unit 18 resets the timer 18*a* (step ST5*a*). After that, the safety data processing unit 7 of the master node 2 returns to step ST1*a* and then carries out the same process.

In contrast, when a proper communication data packet has not been received by the high reliability communication unit 8 (if NO in step ST1*a*), the safety data packet checking unit 18 determines whether the timer 18*a* has timed out, i.e., whether a predetermined receiving time interval has elapsed (step ST6*a*). In this case, whether the timer has not timed out (if NO in step ST6*a*), the safety data packet checking unit returns to step ST1*a* and then carries out the same process.

In contrast, when the timer 18*a* has timed out (if YES in step ST6*a*), when an error is detected in the communication data packet, when the running number is not correct (if NO in step ST2*a*), or when it is determined with the elevator is in a dangerous state through the analysis of the safety data (if YES in step ST4*a*), the safety data analyzer 19 of the master node 2 controls the elevator stopping unit 6 to bring the elevator to an emergency stop (step ST7*a*). More specifically, when the safety data are not transmitted at the predetermined receiving time intervals, when a communication data packet including the safety data has an error, or when a running number is missed though safety data packets to which a series of running numbers are added must be received, the elevator is brought to an emergency stop.

In the above-mentioned explanation, although the case in which the safety data processing unit 7 of the master node 2 handles the communication data packet received from the slave node 3 is shown, the signal transmission device carries out the process according to the same procedure also when the safety data processing unit 7 of the slave node 3 handles a communication data packet received from the master node 2.

However, unlike the safety data processing unit 7 of the master node 2, the safety data processing unit 7 (the safety data analyzer 19) of the slave node 3 does not determine whether or not the elevator is in a dangerous state from the safety data.

When the safety data analyzer 19 of the slave node 3 detects an abnormality in the self-diagnostics on the basis of the safety data which the safety data creating unit 16 in the safety data processing unit 7 has created or when the high reliability communication unit 8 detects an abnormality in the communications, the safety data analyzer notifies the occurrence of an error to the master node 2 via the high reliability communication unit 8, or stops the communications. Although the safety data analyzer makes the notification of the occurrence of an error by transmitting a safety data packet according to the same procedure as that shown in above-mentioned, the contents of the safety data show the occurrence of an error (e.g., a specific bit showing an error is set to on). The safety data processing unit 7 of the master node 2 detects these abnormalities, thereby causing a user to determine that the elevator is in a dangerous state.

(3) The Operation of the High Reliability Communication Unit 8 of the Slave Node 3

Figure 8:
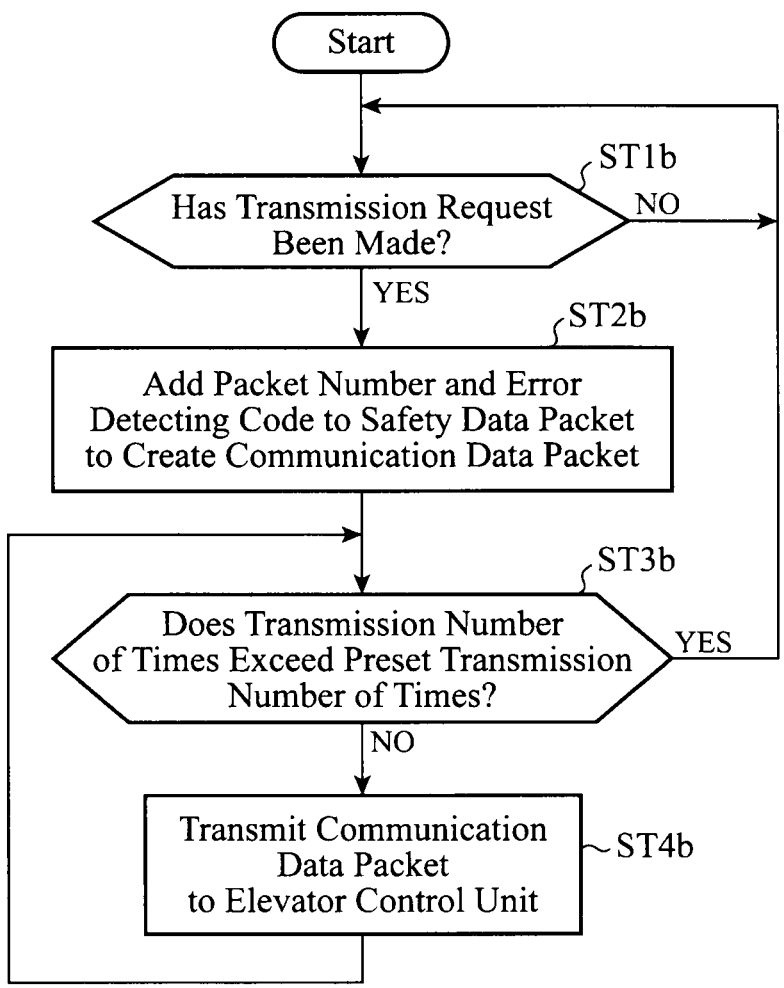
FIG. 8 is a flow chart showing a flow of the operation performed by the high reliability communication unit of the slave node in accordance with Embodiment 1.

FIG. 8 is a flow chart showing a flow of the operation performed by the high reliability communication unit of the slave node in accordance with Embodiment 1. First, the communication data packet creating unit 20 of the slave node 3 checks whether or not a transmission request has been made by the safety data processing unit 7 of the slave node 3 (step ST1*b*). When a transmission request has been made (if YES in step ST1*b*), the communication data packet creating unit 20 accepts a safety data packet corresponding to the transmission request from the safety data processing unit 7, stores the safety data packet in a data portion, and creates a communication data packet to which a packet number and an error detecting code are added (step ST2*b*). A CRC, which is different from that in the safety data processing unit 7, is used as the error detecting code, and a value which is sequentially incremented by one from 0 for each transmission (when the value exceeds its maximum, the value is returned to 0) is used as the packet number.

The continuous transmission control unit 21 of the slave node 3 accepts the communication data packet created by the communication data packet creating unit 20, and carries out a continuous transmission process of continuously transmitting the communication data packet, via the safety network 4, to the master node 2 of the elevator control unit a preset transmission number of times (steps ST3*b* and ST4*b*). When completing the continuous transmission the predetermined transmission number of times, the high reliability communication unit 8 of the slave node 3 returns to step ST1*b*, and carries out the same process. Although the case in which the number of times that the continuous transmission is to be carried out is preset in the above-mentioned operation is shown, the safety data processing unit 7 can alternatively specify the number of times (for example, the safety data processing unit also notifies the number of times that the continuous transmission is to be carried out at the time of making a transmission request).

Furthermore, although the case in which the high reliability communication unit 8 of the slave node 3 transmits the communication data packet to the master node 2 is shown in the above-mentioned explanation, the high reliability communication unit 8 of the master node 2 carries out the process according to the same procedure also when transmitting a communication data packet to the slave node 3.

(4) The Operation of the High Reliability Communication Unit 8 of the Master Node 2

Figure 9:
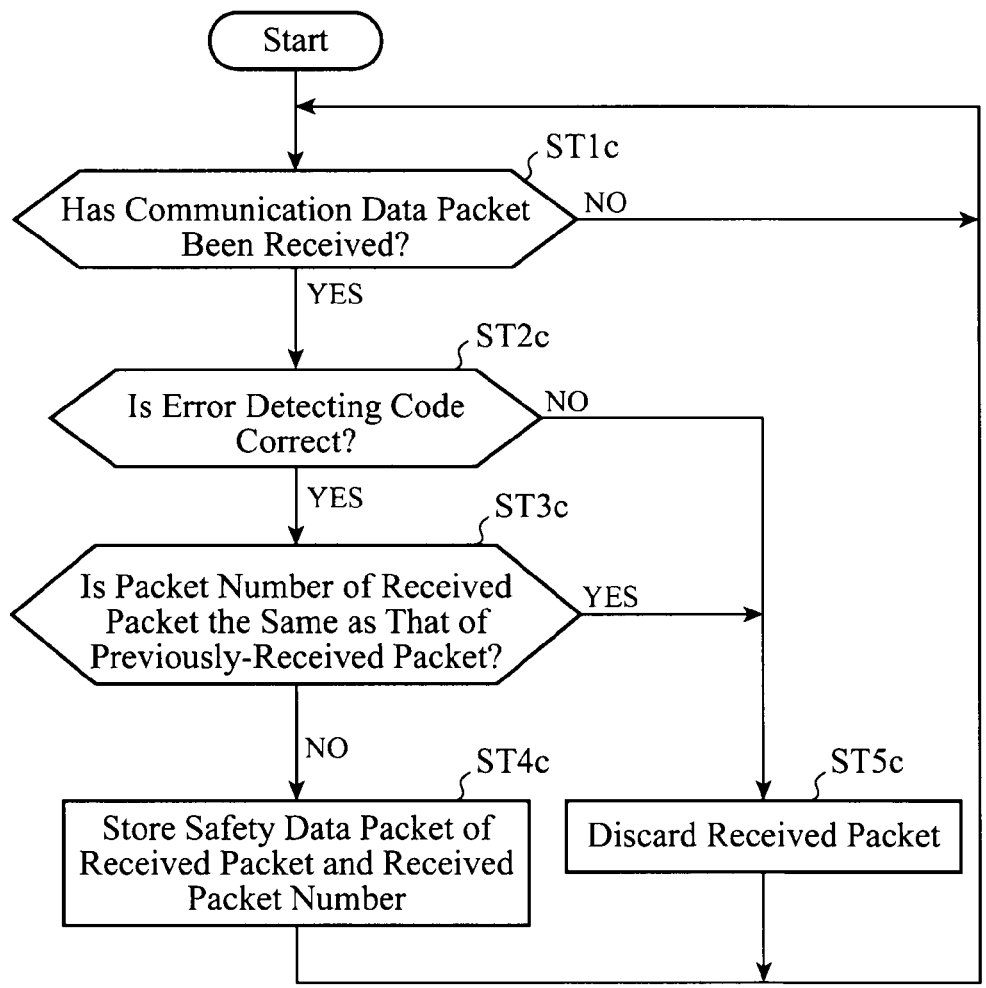
FIG. 9 is a flow chart showing a flow of the operation performed by the high reliability communication unit of the master node in accordance with Embodiment 1.

FIG. 9 is a flow chart showing a flow of the operation performed by the high reliability communication unit of the master node in accordance with Embodiment 1. First, the communication data packet checking unit 22 of the master node 2 checks whether the master node has received a communication data packet from the slave node 3 (step ST1*c*). At this time, when the master node has not received a communication data packet (if NO in step ST1*c*), the communication data packet checking unit repeats the process of step ST1*c* until the master node receives a communication data packet. In contrast, when the master node has received a communication data packet (if YES in step ST1*c*), the communication data packet checking unit 22 checks whether or not the received communication data packet is proper without any error on the basis of the error detecting code which is added to the communication data packet (step ST2*c*).

When the communication data packet is proper without any error (if YES in step ST2*c*), the communication data packet checking unit 22 outputs the safety data packet acquired from the data portion of the communication data packet to the duplication checking unit 23. The duplication checking unit 23 compares the packet number added to the inputted safety data packet with the packet number of the safety data packet stored in the memory 23*a* (the packet number of the safety data packet which was received the last time and which is stored in the memory 23*a*), and determines whether both the packet numbers match each other (step ST3*c*).

When both the packet numbers do not match each other (if NO if step ST3*c*), the duplication checking unit 23 stores the safety data packet and the packet number which are inputted from the communication data packet checking unit 22 this time in the memory 23*a* (step ST4*c*).

In contrast, when an error is detected in the communication data packet (if NO in step ST2*c*) or when the packet number received this time and that received the last time match each other (if YES in step ST3*c*), the duplication checking unit 23 discards the safety data packet received this time (step ST5*c*). When the process of step ST4*c* or ST5*c* is completed, the high reliability communication unit 8 of the master node 2 returns to step ST1*c*, and then carries out the same process.

Although the case in which the high reliability communication unit 8 of the master node 2 carries out the receiving process of receiving the communication data packet from the slave node 3 is shown in the above-mentioned explanation, the high reliability communication unit 8 of the slave node 3 carries out the process according to the same procedure also when carrying out a receiving process of receiving a communication data packet from the master node 2.

Furthermore, in above-mentioned Embodiment 1, although the case in which the reception and checking of the safety data packet are carried out by the safety data processing unit 7 is shown, the high reliability communication unit 8 can notify the reception of the safety data packet to the safety data processing unit 7.

As mentioned above, in the signal transmission device in accordance with this Embodiment 1, each of the master node 2 and the slave node 3 includes the safety data processing unit 7 and the high reliability communication unit 8, and at the time of transmission the safety data processing unit 7 creates a safety data packet including data about safety and outputs the safety data packet to the high reliability communication unit 8, and the high reliability communication unit 8 creates a communication data packet including the safety data packet outputted from the safety data processing unit 7 and transmits the communication data packet via the communication network a predetermined number of times, while at the time of reception, when receiving one or more communication data packets having the same contents properly, the high reliability communication unit 8 determines one of the one or more communication data packets to be an effective communication data packet and outputs the safety data packet acquired from the communication data packet to the safety data processing unit 7, and the safety data processing unit 7 analyzes the state concerning the safety of the elevator on the basis of the data about safety acquired from the safety data packet outputted from the high reliability communication unit 8. Conventionally, because a general-purpose communication circuit which is made to operate by a CPU which functions also as a safety data processing unit is used as a communication unit for transmitting safety data, the processing load increases and the transmission time interval during which data are transmitted becomes long. In contrast, because the signal transmission device is constructed as mentioned above, the high reliability communication unit 8 which is a communication unit for exclusive use can carry out the process for providing an improvement in the reliability of communications of safety data, such as retransmission and continuous transmission which are carried out by a conventional safety data processing unit, independently of the process performed by the safety data processing unit 7. As a result, the signal transmission device becomes able to transmit data at shorter time intervals, and can carry out continuous transmission of the safety data at short time intervals each of which is shorter than a permissible delay time.

When the signal transmission device carries out continuous transmission as mentioned above, although the node on the receive side receives the same safety data a number of times, the high reliability communication unit 8 verifies the sameness of the received data from the packet numbers of the received data packets, and leaves one of the messages which are received duplicately and discards the remaining ones. As a result, because only one data having the same contents are left as the message notified to the safety data processing unit 7, the amount of information to be processed by the safety data processing unit 7 can be reduced and the processing load required for the CPU to handle the safety data can be reduced.

Furthermore, by leaving the function concerning the communication reliability to the high reliability communication unit 8, the amount of data which the safety data processing unit 7 handles can be reduced substantially as compared with the case in which the safety data processing unit 7 carries out continuous transmission, and the number of times that an error detection and diagnostic process is performed per unit of time is reduced. Therefore, there is provided an advantage of being able to improve the rate of overlooking failures which is an indicator showing the safety.

In above-mentioned Embodiment 1, although the structure and operation of the signal transmission device are described by taking the elevator as an example, the signal transmission device in accordance with the present invention can be applied to a system in which safety data are exchanged among plural pieces of equipment, such as pieces of equipment for use in a vehicle or a train.

Embodiment 2.

Figure 10:
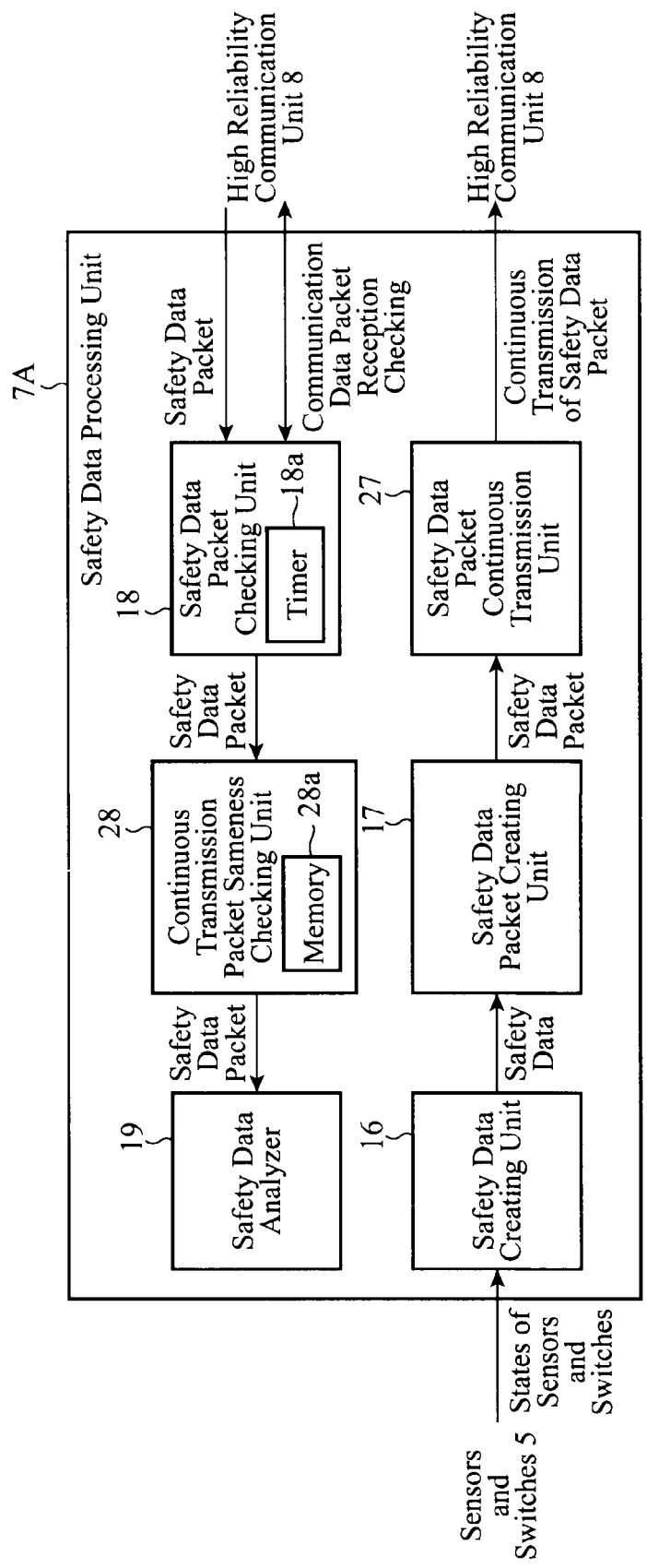
FIG. 10 is a block diagram showing the structure of a safety data processing unit in accordance with Embodiment 2 of the present invention.

FIG. 10 is a block diagram showing the structure of a safety data processing unit in accordance with Embodiment 2 of the present invention. As shown in FIG. 10, the safety data processing unit 7A in accordance with Embodiment 2 has a safety data packet continuous transmission unit (a continuous transmission processing unit) 27 and a continuous transmission packet sameness checking unit (a continuous transmission checking unit) 28, in addition to the structure which is shown in above-mentioned Embodiment 1 with reference to FIG. 3. In FIG. 10, because the structural components other than the safety data packet continuous transmission unit 27 and the continuous transmission packet sameness checking unit 28 are the same as those shown in FIG. 3 or similar to those shown in FIG. 3, the explanation of the components will be omitted hereafter.

The safety data packet continuous transmission unit 27 carries out continuous transmission of a safety data packet having the same contents to a high reliability communication unit 8 a predetermined number of times. Only when receiving a message of a safety data packet having the same running number, which is transmitted a number of times by the safety data packet continuous transmission unit 27, a number of times, and each message has the same contents, the continuous transmission packet sameness checking unit 28 determines that the message of the safety data packet is effective. More specifically, only when all the data which are transmitted the predetermined number of times are proper and have the same contents, the continuous transmission process performed by the safety data packet continuous transmission unit 27 is assumed to be effective, unlike the continuous transmission process performed by the high reliability communication unit 8.

Also in each of nodes 2 and 3 in accordance with this Embodiment 2, the safety data processing unit 7 and the high reliability communication unit 8 have different arithmetic operation units, and these units perform a process of handling the safety data and the continuous transmission process of continuously transmitting the safety data independently of each other. Therefore, the signal transmission device can carry out the continuous transmission process of continuously transmitting the safety data at shorter time intervals as compared with conventional signal transmission devices, and can transmit the safety data certainly even if the safety data need to have a shorter permissible response time.

Next, the operation of the signal transmission device will be explained.

(1) The Operation of the Safety Data Processing Unit 7A of the Slave Node 3

Figure 11:
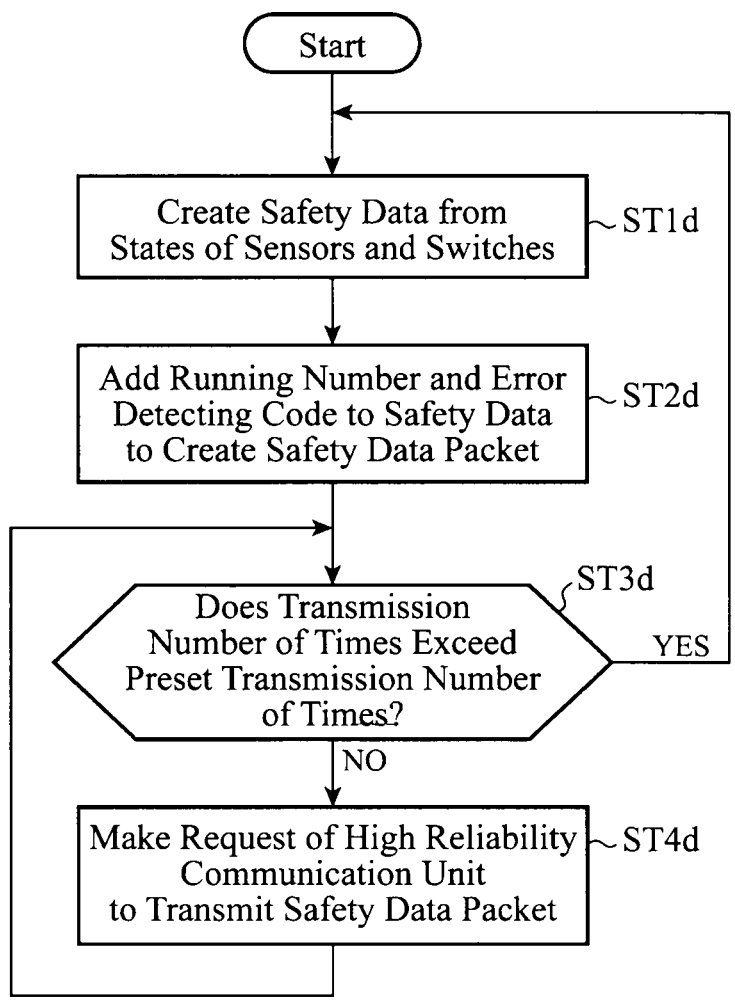
FIG. 11 is a flow chart showing a flow of the operation performed by the safety data processing unit of a slave node in accordance with Embodiment 2.

FIG. 11 is a flow chart showing a flow of the operation performed by the safety data processing unit of the slave node in accordance with Embodiment 2. First, a safety data creating unit 16 of the slave node 3 creates safety data from pieces of state information about the states of sensors and switches (sensor and switches having a possibility of leading to an accident of an elevator according to their states) inputted from sensors and switches 5 (step ST1). When receiving the safety data from the safety data creating unit 16, a safety data packet creating unit 17 adds a running number and an error detecting code to the safety data to create a safety data packet (step ST2d).

Also in this Embodiment 2, a CRC is used as the error detecting code, for example, and a value which is sequentially incremented by one from 0 for each transmission (when the value exceeds its maximum, the value is returned to 0) is used as the running number. After creating the safety data packet, the safety data packet creating unit 17 outputs the safety data packet to the safety data packet continuous transmission unit 27.

The safety data packet continuous transmission unit 27 makes a request of the high reliability communication unit 8 to transmit the safety data packet inputted from the safety data packet creating unit 17 a preset transmission number of times (steps ST3d and ST4d). After the safety data packet continuous transmission unit completes the transmission request, the safety data processing unit 7 of the slave node 3 returns to step ST1d and then repeats the same process.

Furthermore, in the above-mentioned explanation, although the case in which the safety data processing unit 7A of the slave node 3 creates a safety data packet to be transmitted to the master node 2 and makes a request to transmit the safety data packet is shown, the signal transmission device carries out the process according to the same procedure also when the safety data processing unit 7A of the master node 2 creates a safety data packet to be transmitted to the slave node 3 and makes a request to transmit the safety data packet.

(2) The Operation of the Safety Data Processing Unit 7A of the Control Panel Master Node 2

Figure 12:
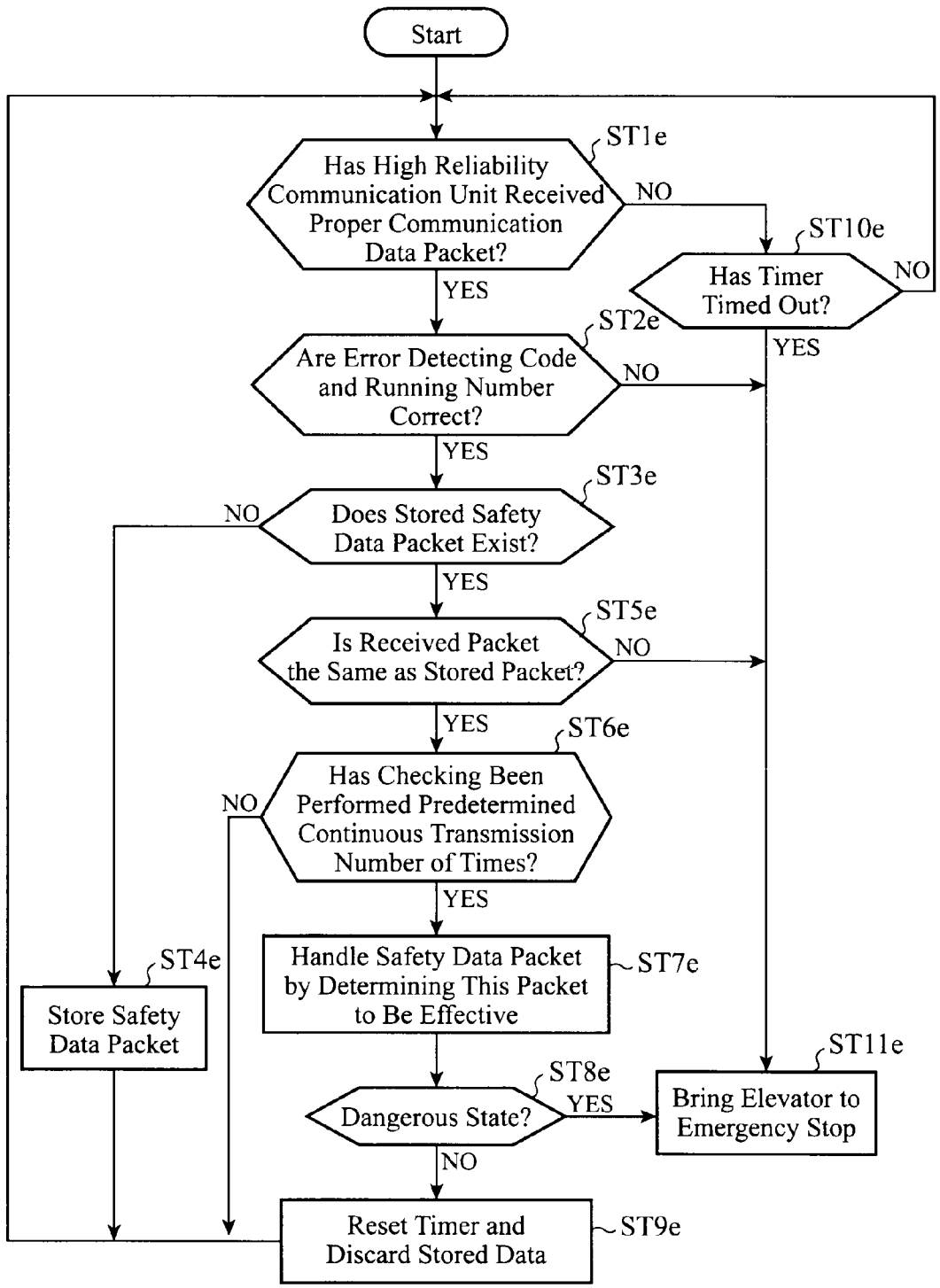
FIG. 12 is a flow chart showing a flow of the operation performed by the safety data processing unit of a master node in accordance with Embodiment 2.

FIG. 12 is a flow chart showing a flow of the operation performed by the safety data processing unit of the master node in accordance with Embodiment 2. First, while a safety data packet checking unit 18 of the master node 2 starts counting a timer 18a built therein for monitoring the receiving time interval of a communication data packet (in an initial state, the timer has a count of 0), the safety data packet checking unit checks whether the high reliability communication unit 8 of the master node 2 has received a communication data packet properly (step ST1e). The safety data packet checking unit 18 can verify whether a communication data packet has been received properly by checking whether the received data packet is stored in the high reliability communication unit 8.

When a communication data packet has been received properly (if YES in step ST1e), the safety data packet checking unit 18 accepts this communication data packet from the high reliability communication unit 8, and acquires the safety data packet from the data portion of the communication data packet. While the safety data packet checking unit 18 then carries out an error detection process by checking the error detecting code, the safety data packet checking unit checks if there is neither a lack nor duplication of a message from the running number (step ST2e).

When no error is detected through the checking of the error detecting code and the running number is determined to be correct (if YES in step ST2e), the safety data packet checking unit 18 determines that the safety data packet acquired from the data portion of the communication data packet is effective, and outputs this safety data packet to the continuous transmission packet sameness checking unit 28.

When receiving the safety data packet inputted from the safety data packet checking unit 18, the continuous transmission packet sameness checking unit 28 determines whether or not a safety data packet is stored in a memory 28a (step ST3e). At this time, when no safety data packet is stored in the memory 28a (if NO in step ST3e), the continuous transmission packet same checking unit 28 stores the safety data packet which is inputted from the safety data packet checking unit 18 this time in the memory 28a (step ST4e). After that, the continuous transmission packet sameness checking unit returns to step ST1e and carries out the same process.

In contrast, when a safety data packet is stored in the memory 28a (if YES in step ST3e), the continuous transmission packet sameness checking unit 28 compares the safety data packet which is received this time with the safety data packet stored in the memory 28a (for example, compares either the value of the safety data stored in the data portion or the running number with that stored in the memory) to determine whether both the packets are the same as each other (step ST5e).

When both the packets are the same as each other (if YES in step ST5e), the continuous transmission packet sameness checking unit 28 determines whether the safety data packet which are received this time has been transmitted continuously a predetermined continuous transmission number of times and has the same contents and whether the checking in step ST5e has been carried out the predetermined continuous transmission number of times (step ST6e). When determining that the checking in step ST5e has been carried out the predetermined continuous transmission number of times (if YES in step ST6e), the continuous transmission packet sameness checking unit 28 determines that all of the newly-received safety data packets have been received properly even though the safety data packet is transmitted the predetermined number of times, and they have the same contents, then determines that these safety data packets are effective, and outputs only one of the safety data packets to a safety data analyzer 19 (step ST7e).

The safety data analyzer 19 acquires the safety data from the data portion of the inputted safety data packet, and analyzes the safety data to determine whether or not the elevator is in a dangerous state (step ST8e). At this time, when the elevator is not in a dangerous state (if NO in step ST8e), the safety data analyzer 19 notifies the safety data packet checking unit 18 and the continuous transmission packet sameness checking unit 28 to that effect. When receiving this notification, the safety data packet checking unit 18 resets the timer 18a and the continuous transmission packet sameness checking unit 28 discards the safety data packet which it has stored in the memory 28a (step ST9e). After that, the safety data processing unit 7A of the master node 2 returns to step ST1e and then carries out the same process.

In contrast, when a proper communication data packet has not been received by the high reliability communication unit 8 (if NO in step ST1e), the safety data packet checking unit 18 determines whether the timer 18a has timed out, i.e., whether a predetermined receiving time interval has elapsed (step ST10e). At this time, whether the timer has not timed out (if NO in step ST10e), the safety data packet checking unit returns to step ST1e and then carries out the same process.

In contrast, when the timer 18a has timed out (if YES in step ST10e), when an error is detected in the communication data packet or when the running number is not correct (if NO in step ST2e), when the safety data packet received this time is not the same as the safety data packet stored in the memory 28a (if NO in step ST5e), or when it is determined with the elevator is in a dangerous state through the analysis of the safety data (if YES in step ST8e), the safety data analyzer 19 of the master node 2 promptly controls an elevator stopping unit 6 to bring the elevator to an emergency stop (step ST11e).

In the above-mentioned explanation, although the case in which the safety data processing unit 7A of the master node 2 handles the communication data packet received from the slave node 3 is shown, the signal transmission device carries out the process according to the same procedure also when the safety data processing unit 7A of the slave node 3 handles a communication data packet received from the master node 2.

However, unlike the safety data processing unit 7A of the master node 2, the safety data processing unit 7A (the safety data analyzer 19) of the slave node 3 does not determine whether or not the elevator is in a dangerous state from the safety data. When the safety data analyzer 19 of the slave node 3 detects an abnormality in the self-diagnostics on the basis of the safety data which the safety data creating unit 16 in the safety data processing unit 7 has created or when the high reliability communication unit 8 detects an abnormality in the communications, the safety data analyzer notifies the occurrence of an error to the master node 2 via the high reliability communication unit 8, or stops the communications. The safety data processing unit 7A of the master node 2 detects these abnormalities, thereby causing a user to determine that the elevator is in a dangerous state.

As mentioned above, in accordance with this Embodiment 2, the safety data processing unit 7A includes the safety data packet continuous transmission unit 27 for making a request of the high reliability communication unit 8 to transmit a safety data packet created by the safety data packet creating unit 17 the predetermined number of times, and the continuous transmission packet sameness checking unit 28 for, when the high reliability communication unit 8 properly receives all communication data packets which have been transmitted the predetermined number of times, and all safety data packets acquired from the plural communication data packets have the same contents, determining that the safety data packets are effective data, and analyzes the state concerning the safety of the elevator on the basis of the safety data acquired from the safety data packets which are determined to be effective by the continuous transmission packet sameness checking unit 28.

Because the signal transmission device is constructed in this way, the safety data packet having the same contents is communicated a number of times between the safety data processing unit 7A of the master node 2 and the safety data processing unit 7A of the slave node 3, and therefore, even when either one of the communication data packets has an error and the safety data packet checking unit 18 cannot detect the error (when the safety data packet checking unit overlooks the error), the signal transmission device becomes able to detect the error from a comparison with another safety data packet which has been received properly. As a result, the safety of the elevator can be improved.

Embodiment 3.

Figure 13:
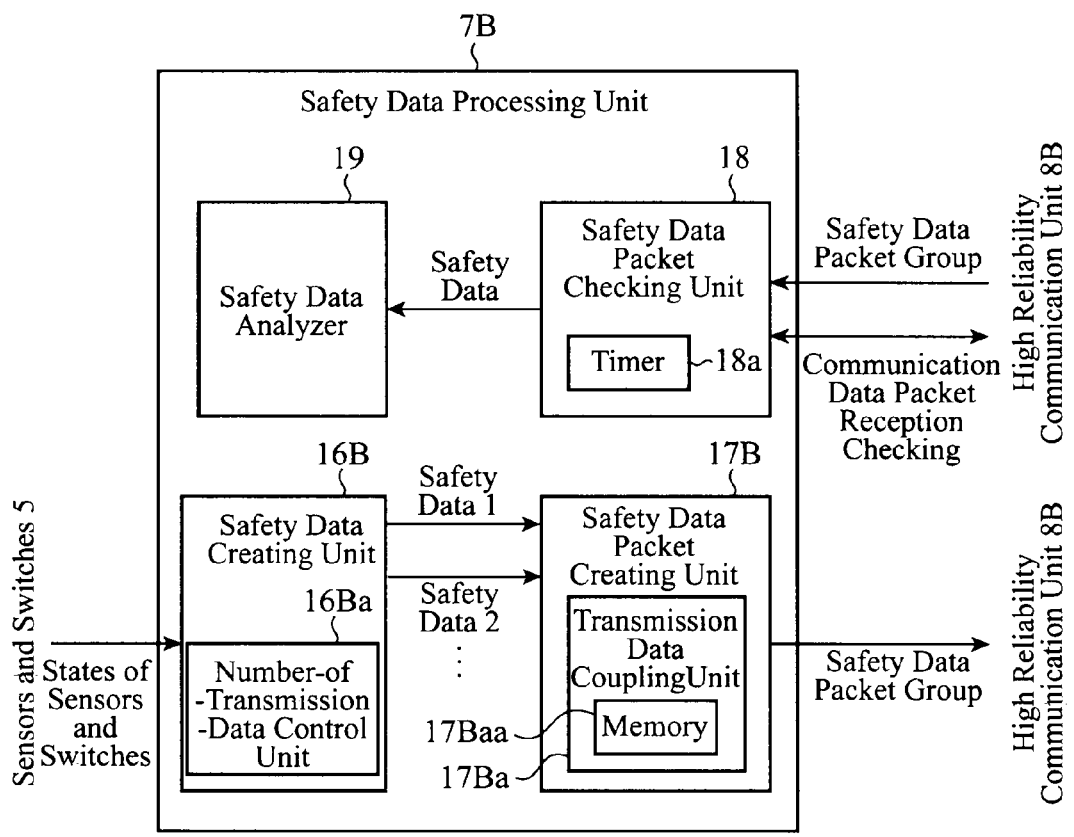
FIG. 13 is a block diagram showing the structure of a safety data processing unit in accordance with Embodiment 3 of the present invention.

FIG. 13 is a block diagram showing the structure of a safety data processing unit in accordance with Embodiment 3 of the present invention. As shown in FIG. 13, the safety data processing unit 7B in accordance with Embodiment 3 is provided with a number-of-transmission-data control unit 16Ba and a transmission data coupling unit 17Ba in addition to the structure which is shown in above-mentioned Embodiment 1 with reference to FIG. 3. In FIG. 13, because the structural components other than the number-of-transmission-data control unit 16Ba and the transmission data coupling unit 17Ba are the same as those shown in FIG. 3 or similar to those shown in FIG. 3, the explanation of the components will be omitted hereafter.

In FIG. 13, a safety data creating unit 16B of the safety data processing unit 7B creates a plurality of safety data during a single cycle. Sensor switches 5 which are inputs of safety data and are classified into some groups having different priorities according to the inputted types of sensors or the types of data, and data having the same priority are created as one safety data.

The safety data creating unit 16B has the number-of-transmission-data control unit 16Ba, and the number-of-transmission-data control unit 16Ba controls the number of the plurality of safety data in such a way that the total size of the plurality of safety data which are created during a single cycle does not exceed a packet size of a high reliability communication unit 8B.

As a method of controlling the amount of transmitted data, a method of designing the safety data in such a way that the safety data have a size which does not exceed the packet size of the high reliability communication unit 8B in advance is provided. A priority control unit for, when the total amount of the data exceeds the packet size, adjusting the frequency at which to transmit the safety data according to the above-mentioned priority (how many cycles should elapse for one-time transmission) can be disposed separately.

A safety data packet creating unit 17B adds a running number and an error detecting code to each of the plurality of safety data sent from the safety data creating unit 16B, and then delivers them to the transmission data coupling unit. The transmission data coupling unit 17Ba couples the plurality of safety data packets created by safety data packet creating unit together on a memory 17Baa, and inputs the coupled data at the time when all the safety data packets to be transmitted during that cycle are created to the high reliability communication unit 8B.

Figure 14:
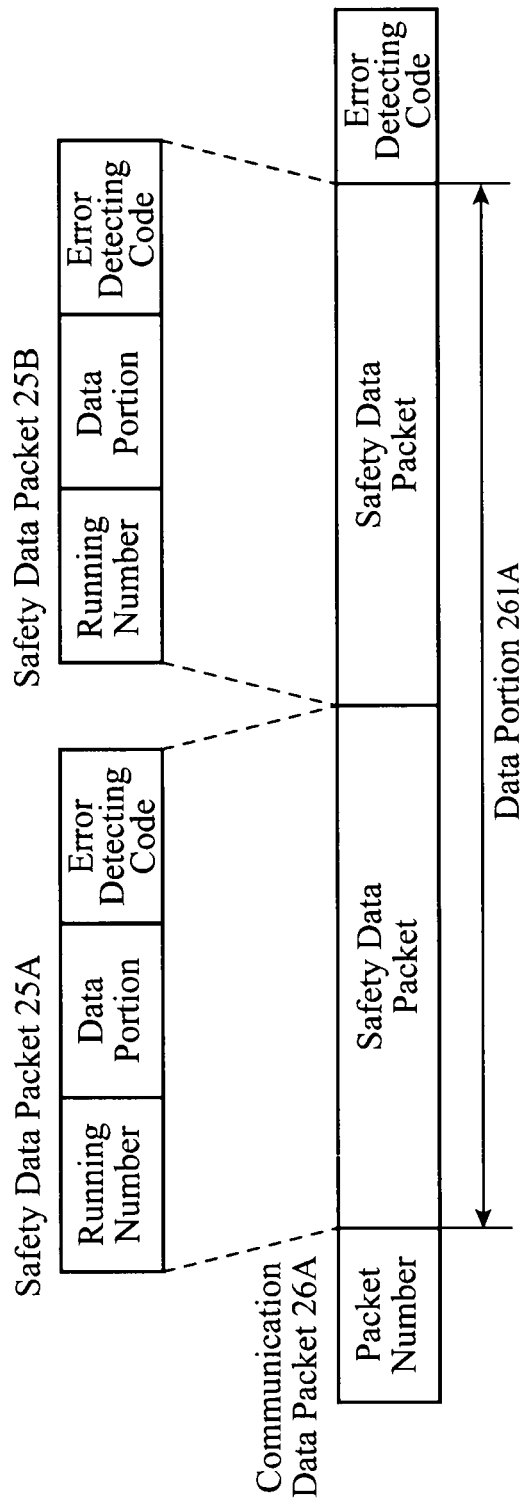
FIG. 14 is a view showing the structure of a communication data packet exchanged in a signal transmission device for elevator in accordance with Embodiment 3.

FIG. 14 is a view showing the structure of a communication data packet exchanged in the signal transmission device for elevator in accordance with Embodiment 3. As shown in FIG. 14, safety data packets (first data) 25A and 25B created by the safety data packet creating unit 17B are stored in a data portion 261A of a communication data packet (second data) 26A created by a communication data packet creating unit 20 of the high reliability communication unit 8B.

Next, the operation of the safety data processing unit will be explained.

(1) The Operation of the Safety Data Processing Unit 7B of a Slave Node 3

Figure 15:
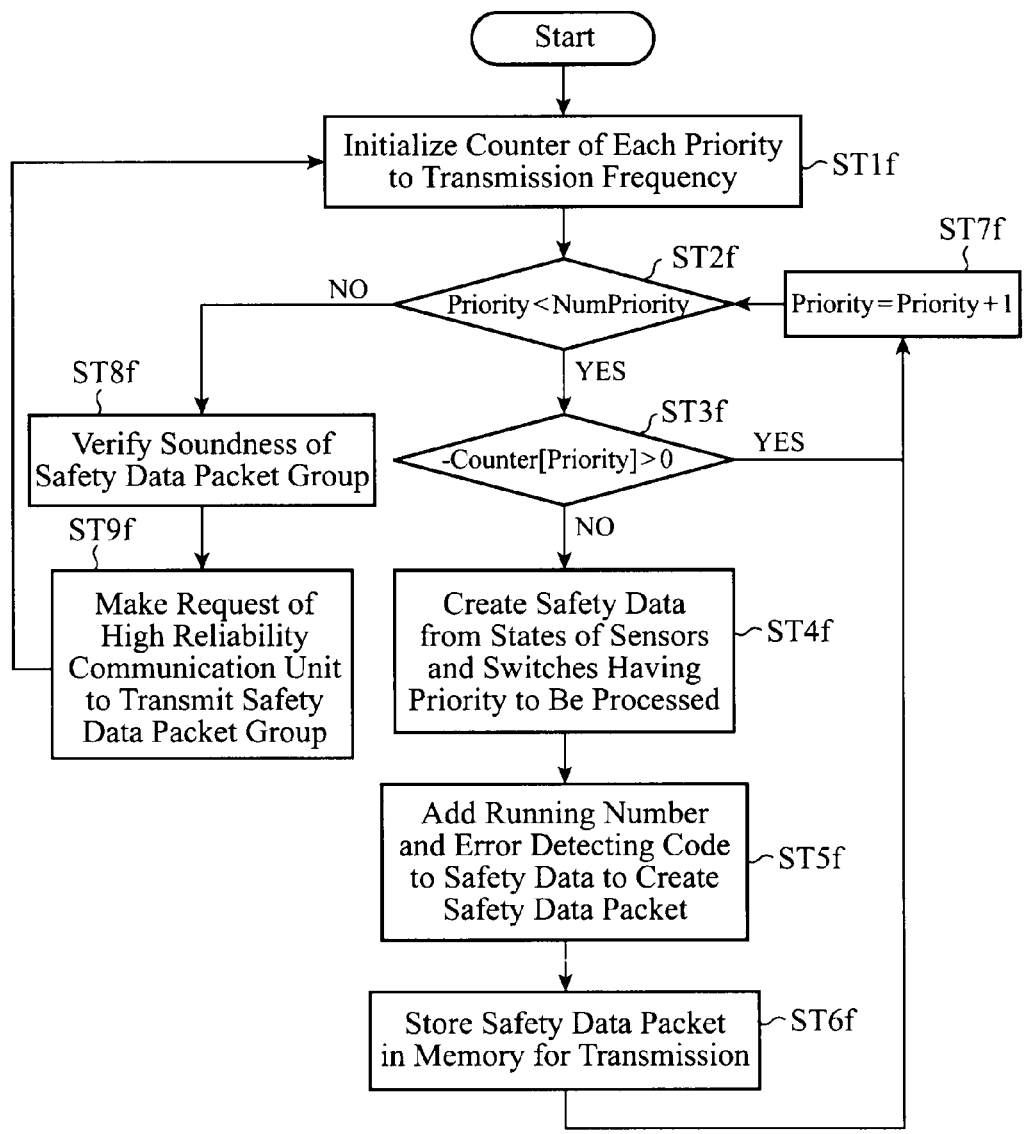
FIG. 15 is a flow chart showing a flow of the operation performed by the safety data processing unit of a slave node in accordance with Embodiment 3.

FIG. 15 is a flow chart showing a flow of the operation during a single cycle of the safety data processing unit of the slave node in accordance with Embodiment 3. The safety data processing unit repeats the following operation for all the priorities mentioned above (step ST2*f*).

First, the number-of-transmission-data control unit 16Ba of the safety data creating unit 16B determines whether the data having the priority are safety data to be transmitted this time (step ST3*f*). As a method of determining whether or not the data having the priority can be transmitted, there is a method of providing a transmission counter for each priority, for example, initializing the transmission counter to the number of transmission time intervals, decrementing the transmission counter every time when transmission judgment is carried out, and determining that the data should be transmitted when the transmission counter becomes zero or less whereas determining that the data do not have to be transmitted when the transmission counter is equal to or greater than 1.

When the result of the determination shows that the data do not have to be transmitted, the number-of-transmission-data control unit performs the process for the next priority, whereas when the result of the determination shows that the data need to be transmitted, the number-of-transmission-data control unit acquires state information from sensors and switches belonging to the priority, and creates safety data (step ST4*f*). When receiving the safety data from the safety data creating unit 16B, the safety data packet creating unit 17B adds a running number and an error detecting code to the safety data to create a safety data packet (step ST5*f*).

The safety data packet creating unit delivers the safety data packet created thereby to the transmission data coupling unit and stores it in a memory for transmission in turn (step ST6*f*), and then returns to step ST2*f* via step ST7*f* and repeats the same process for the next priority.

When, in step ST2*f*, completing the process for each of all the priorities, the safety data packet creating unit verifies the soundness of the data in the memory for transmission (step ST8*f*), and, after that, makes a request of the high reliability communication unit to transmit the group of safety data packets stored in the memory for transmission (step ST9*f*) and ends the process during this cycle, and then returns to step ST1*f* and repeats the process for the next time period.

(2) The Operation of the Safety Data Processing Unit 7B of the Master Node 2

The operation of the safety data processing unit 7B of the master node 2 in accordance with Embodiment 3 differs only in that data inputted from the high reliability communication unit 8B include a plurality of safety data packets, and because a process of handling each safety data packet is the same as the process of FIG. 8, the explanation of the process will be omitted hereafter.

As mentioned above, because the signal transmission device in accordance with this Embodiment 3 can couple a plurality of safety data and can transmit these safety data as a single communication data packet, even when two or more safety data types exist, and the size of each safety data is smaller than a minimum size which can be transmitted via a safety network, the signal transmission device can carry out the continuous transmission process of continuously transmitting the safety data at shorter time intervals and can transmit the safety data certainly even if the safety data need to have a shorter permissible response time.

Embodiment 4.

Figure 16:
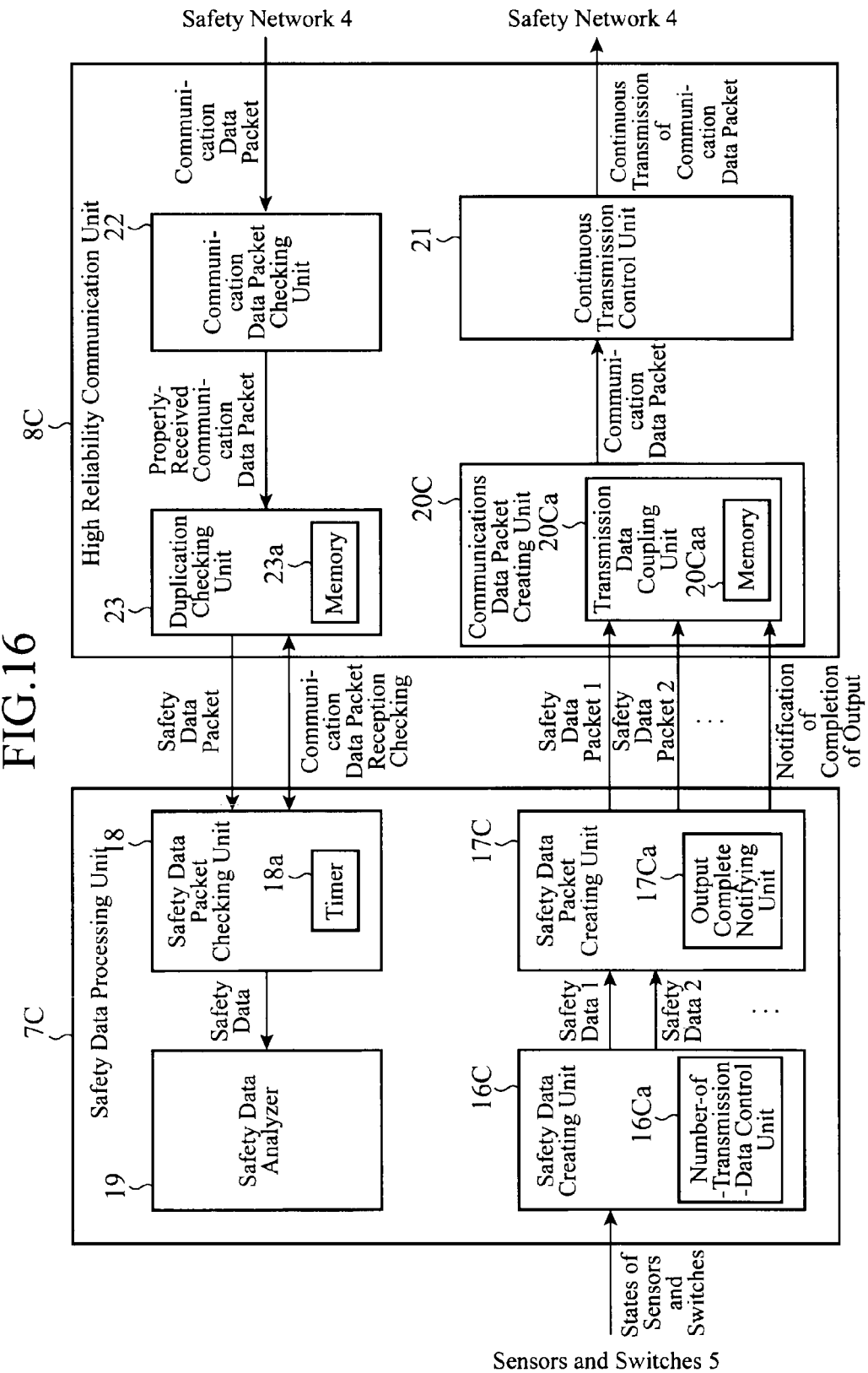
FIG. 16 is a block diagram showing the structure of a safety data processing unit and that of a high reliability communication unit in accordance with Embodiment 4 of the present invention.

FIG. 16 is a block diagram showing the structure of a high reliability communication unit and that of a safety data processing unit in accordance with Embodiment 4 of the present invention. As shown in FIG. 16, the safety data processing unit 7C in accordance with Embodiment 4 has a number-of-transmission-data control unit 16Ca and an output complete notifying unit 17Ca in addition to the structure which is shown in above-mentioned Embodiment 1 with reference to FIG. 3, and the high reliability communication unit BC has a transmission data coupling unit 20Ca in addition to the structure which is shown in above-mentioned Embodiment 1 with reference to FIG. 4. In FIG. 16, because the structural components other than the number-of-transmission-data control unit 16Ca, the output complete information unit 17Ca, and the transmission data coupling unit are the same as those shown in FIGS. 3 and 4 or similar to those shown in FIGS. 3 and 4, the explanation of the components will be omitted hereafter. Furthermore, in FIG. 16, because a safety data creating unit 16C of the safety data processing unit 7C is the same as the safety data creating unit 16B in FIG. 13, the explanation of the safety data creating unit 16C will be omitted hereafter.

A safety data packet creating unit 17C adds a running number and an error detecting code to each of a plurality of safety data sent from the safety data creating unit 16C and makes a request for transmission of the high reliability communication unit 8C. Furthermore, the safety data packet creating unit 17C has output complete notifying unit 17Ca, and the output complete notifying unit 17Ca sends a command to transmit data to the high reliability communication unit 80 when the safety data packet creating unit completes all requests to transmit all safety data to be transmitted during a single cycle.

On the other hand, the transmission data coupling unit 20Ca of the high reliability communication unit 8C couples a plurality of safety data packets which the high reliability communication unit is requested to transmit by the safety data processing unit 7C on a memory 20Caa, and inputs the coupled data to a continuous transmission control unit 21 at the time when receiving an output completion notification from the output complete notifying unit 17Ca of the safety data processing unit 7C.

Next, the operation of the high reliability communication unit and that of the safety data processing unit will be explained.

(1) The Operation of the Safety Data Processing Unit 7C of the Slave Node 3

Figure 17:
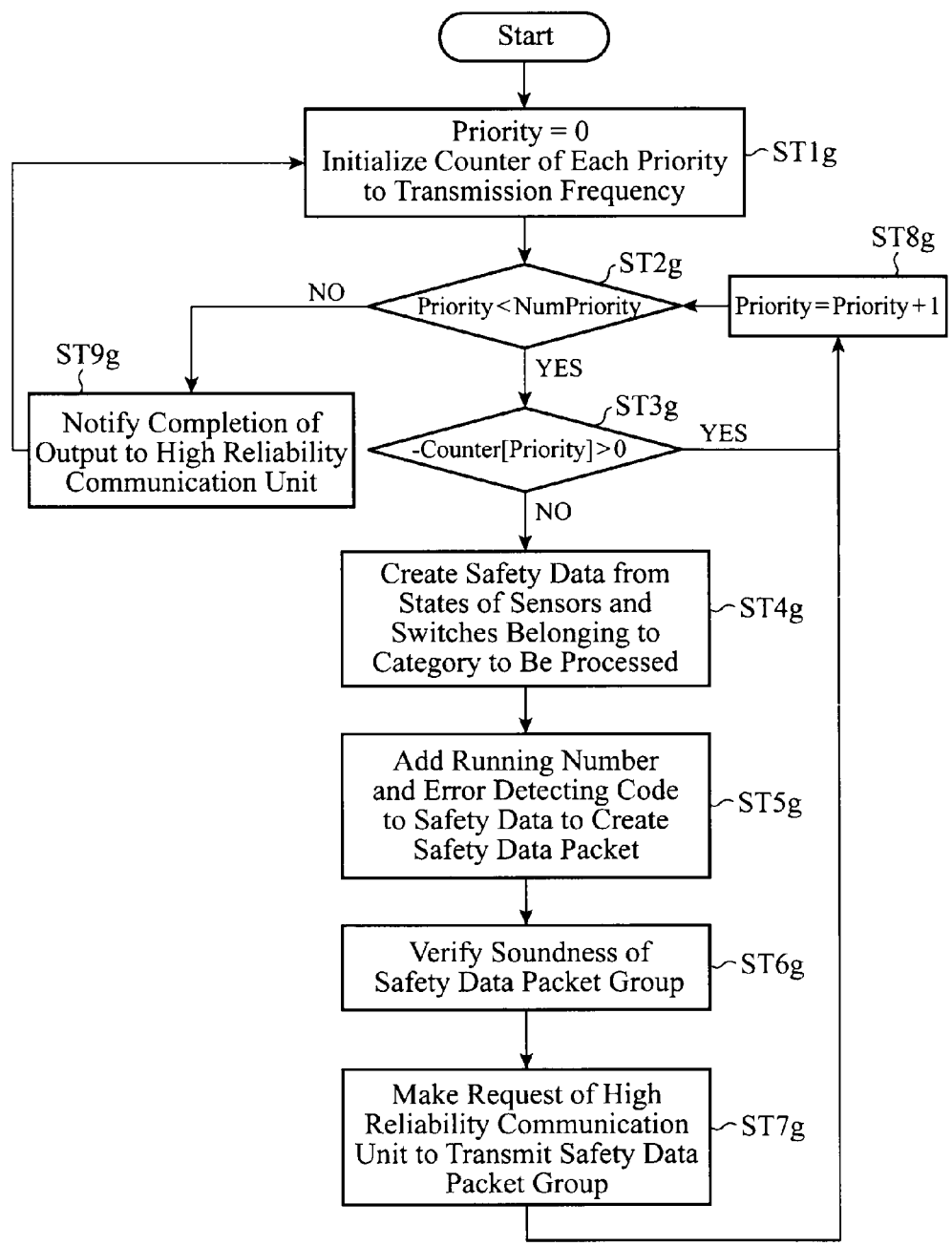
FIG. 17 is a flow chart showing a flow of the operation performed by the safety data processing unit of an a slave node in accordance with Embodiment 4.

FIG. 17 is a flow chart showing a flow of the operation during a single cycle which is performed by the safety data processing unit of the slave node in accordance with Embodiment 4. The safety data processing unit repeats the following operations for all the priorities mentioned above (step ST2g).

First, the number-of-transmission-data control unit 16Ca of the safety data creating unit 16C determines whether or not data having the priority are safety data to be transmitted this time (step ST3g). When the result of the determination shows that the data do not have to be transmitted, the number-of-transmission-data control unit performs the process for the next priority, whereas when the result of the determination shows that the data need to be transmitted, the number-of-transmission-data control unit acquires state information from sensors and switches belonging to the priority, and creates safety data (step ST4g).

When receiving the safety data from the safety data creating unit 16C, the safety data packet creating unit 17C adds a running number and an error detecting code to the safety data to create a safety data packet (step ST5g).

After creating the safety data packet, the safety data packet creating unit 17C checks the soundness of the safety data packet (step ST6g), and makes a request for transmission of the high reliability communication unit 8C (step ST7g).

After the safety data packet creating unit completes the transmission request, the safety data processing unit 7C of the slave node 3 returns to step ST2g via step ST8g, and repeats the same process for the next priority. When the safety data processing unit, in step ST2g, completes the process for all the priorities, the output complete notifying unit 17Ca sends a notification of the completion of output to the high reliability communication unit 8C (step ST9g), ends the process during this cycle, and returns to step ST1g and repeats the process during the next cycle.

(2) The Operation of the Safety Data Processing Unit 7C of the Master Node 2

The operation of the safety data processing unit 7C of the master node 2 in accordance with Embodiment 4 differs only in that data inputted from the high reliability communication unit 8C include a plurality of safety data packets, and because a process of handling each safety data packet is the same as the process of FIG. 8, the explanation of the process will be omitted hereafter.

(3) The Operation of the High Reliability Communication Unit 8C of the Slave Node 3

Figure 18:
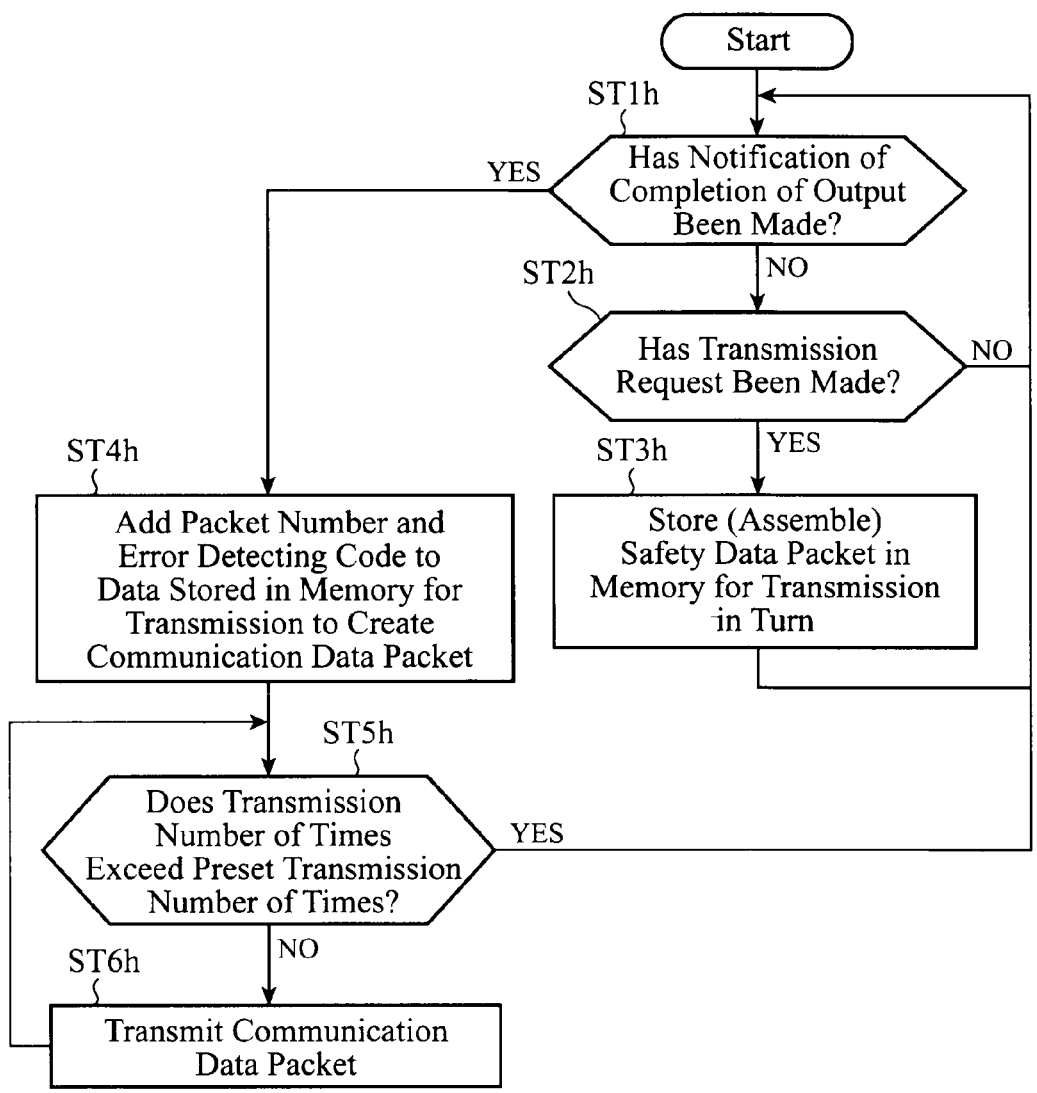
FIG. 18 is a flow chart showing a flow of the operation performed by the high reliability communication unit of the slave node in accordance with Embodiment 4.

FIG. 18 is a flow chart showing a flow of the operation during a single cycle which is performed by the high reliability communication unit of the slave node in accordance with Embodiment 4.

First, the transmission data coupling unit 20Ca checks whether a notification of the completion of output has been made by the safety data processing unit 7C (step ST1h).

When a notification of the completion of output has not been made (if NO in step ST1h), the transmission data coupling unit checks whether a transmission request has been made by the safety data processing unit 7C (step ST2h). When a transmission request has been made (if YES in step ST2h), the transmission data coupling unit 20Ca receives a safety data packet corresponding to the transmission request from the safety data processing unit 7C, stores the safety data packet in memory 20Caa for transmission in turn (step ST3h), and then returns to step ST1h and continues the process.

In contrast, when a notification of the completion of output has been made (if YES in step ST1h), the communication data packet creating unit 20C creates a communication data packet in which a group of safety data packets coupled and accumulated on the memory for transmission are stored in a data portion (step ST4h). Because the subsequent operations are the same as those in step ST3b and the subsequent steps of FIG. 8, the explanation of the operations will be omitted.

(4) The Operation of the High Reliability Communication Unit 8C of the Master Node 2

Because the operation of the high reliability communication unit 8C of the master node 2 in accordance with Embodiment 4 is the same as that of the high reliability communication unit 8 in accordance with Embodiment 1, the explanation of the operation will be omitted.

As mentioned above, because the signal transmission device in accordance with this Embodiment 4 can couple a plurality of safety data and can transmit these safety data as a single communication data packet, even when two or more safety data types exist, and the size of each safety data is smaller than a minimum size which can be transmitted via a safety network, the signal transmission device can carry out the continuous transmission process of continuously transmitting the safety data at shorter time intervals and can transmit the safety data certainly even if the safety data need to have a shorter permissible response time.

Furthermore, in order to assure the safety of the process, the signal transmission device carries out the coupling process by using the high reliability communication unit that can use an internal memory having a high access speed and built in the CPU without using the safety data processing unit that has to use a memory having a low access speed and disposed outside the CPU. Therefore, the signal transmission device can speed up a copying process which is required when performing the coupling process, and can reduce the processing load which is required to handle the safety data as a whole. Furthermore, the signal transmission device provides an advantage of being able to reduce the memory amount of the safety data processing unit in which multiple memories need to be disposed.

Embodiment 5.

Figure 19:
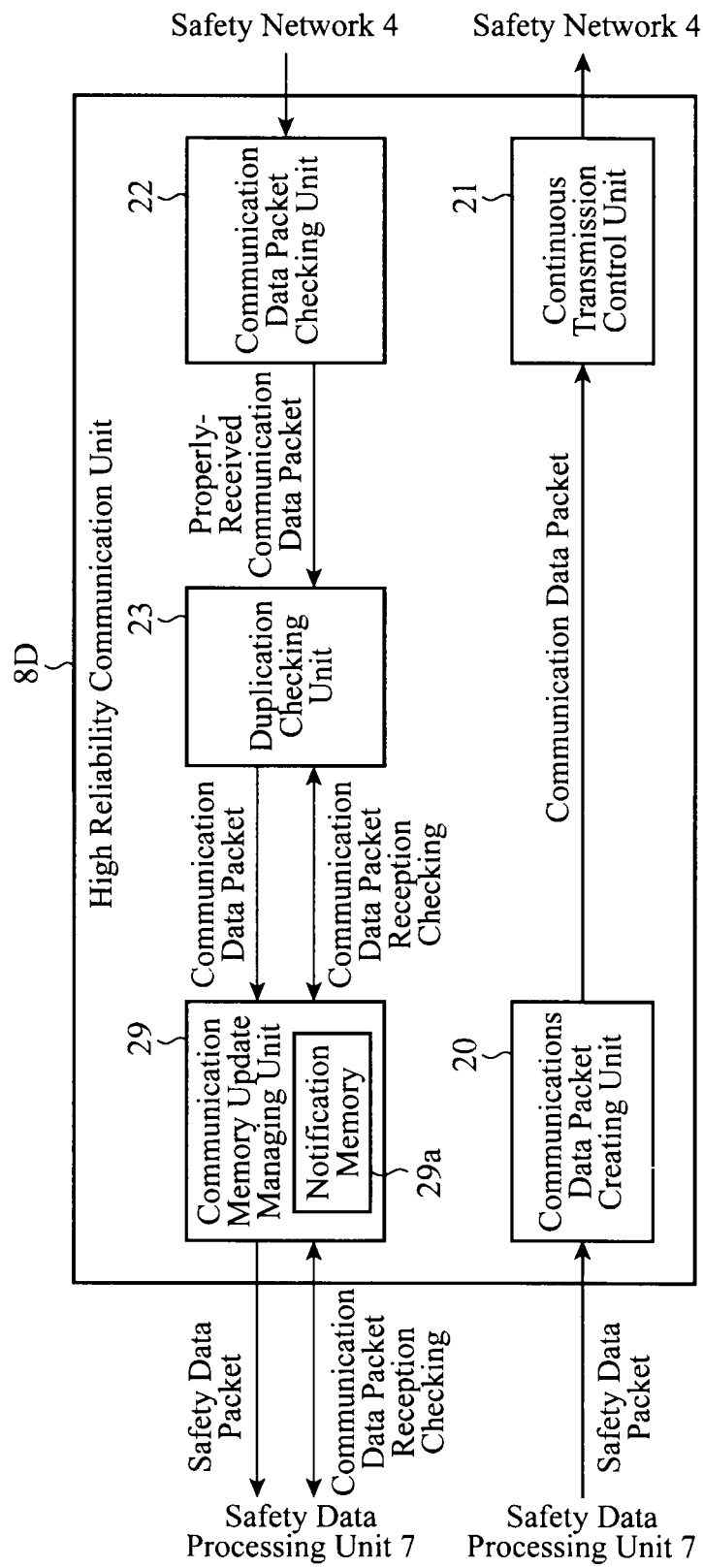
FIG. 19 is a block diagram showing the structure of a high reliability communication unit in accordance with Embodiment 5 of the present invention.

FIG. 19 is a block diagram showing the structure of a high reliability communication unit in accordance with Embodiment 5 of the present invention. As shown in FIG. 19, the high reliability communication unit 8D in accordance with Embodiment 5 includes a communication memory update managing unit 29 in addition to the structure which is shown in above-mentioned Embodiment 1 with reference to FIG. 3. In FIG. 19, because the structural components other than the communication memory update managing unit 29 are the same as those shown in FIG. 4 or similar to those shown in FIG. 4, the explanation of the components will be omitted hereafter.

In FIG. 19, the communication memory update managing unit 29 of the high reliability communication unit 8D is a functional component for notifying arrival of a communication data packet to a safety data processing unit 7 at predetermined intervals, and inquires of a duplication checking unit 23 whether or not a communication data packet is received at predetermined intervals and copies received data into a memory thereof while sending an update state of a notification memory 29a thereof in response to an inquiry about whether or not a communication data packet is received from the safety data processing unit 7.

Figure 20:
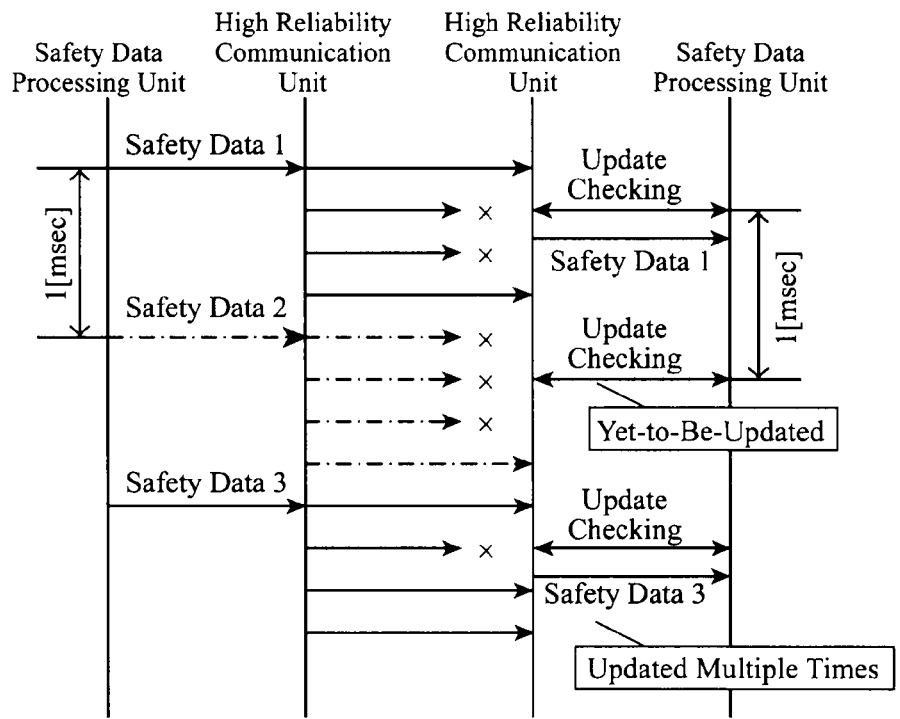
FIG. 20 is a sequence diagram showing a flow of a transmitting and receiving process operation carried out by the signal transmission device for elevator in accordance with Embodiment 1.
Figure 21:
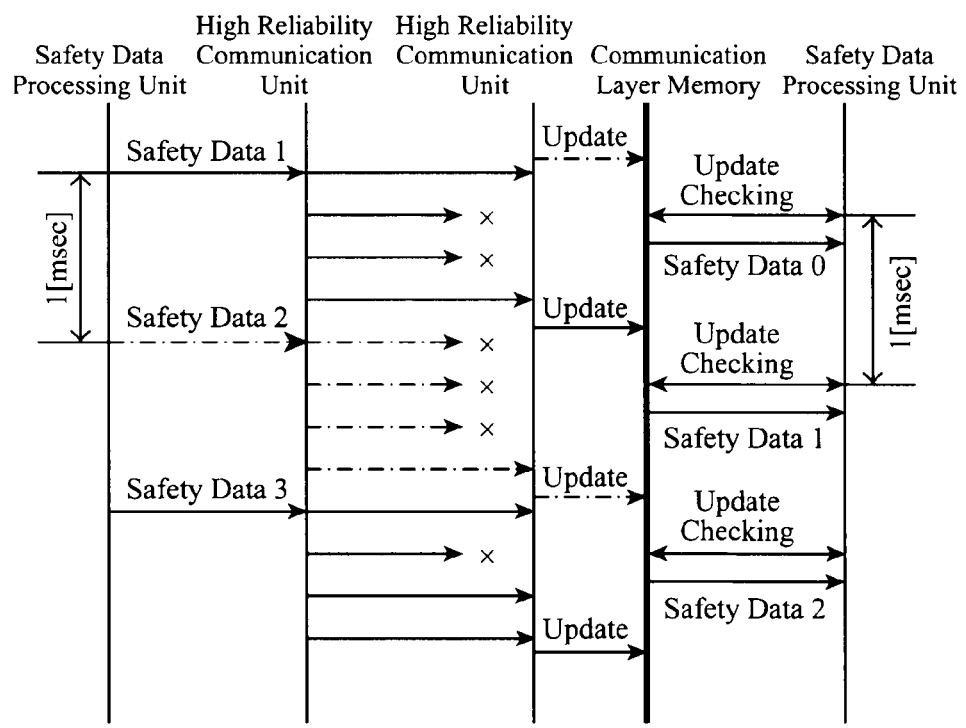
FIG. 21 is a sequence diagram showing a flow of a transmitting and receiving process operation carried out by a signal transmission device for elevator in accordance with Embodiment 5.

FIG. 20 is a sequence diagram showing a flow of transmitting and receiving process operations in the structure in accordance with Embodiment 1, and FIG. 21 is a sequence diagram showing a flow of those in the structure in accordance with Embodiment 5. In the continuous transmission process, the time when the memory of the duplication checking unit of the high reliability communication unit 8D is updated shifts forward and backward during a processing cycle. Therefore, in the structure shown in FIG. 19, if checking for update from the safety data processing unit 7 is not carried out within a time period (associated with the continuous transmission number of times) between the time when receiving the final one of data which were continuously transmitted the last time and the time when receiving the first one of data which will be continuously transmitted the next time, a case in which new proper data are not received after the last checking for update (a yet-to-be updated case) or a case in which two or more new proper data are received after the last checking for update (a multiple-times updated case) occurs, as shown in FIG. 20, and an abnormality is therefore detected by the safety data processing unit.

To solve this problem, in accordance with Embodiment 5, the communication memory update managing unit 29 of the high reliability communication unit 8D on the receive side controls the intervals at which the notification memory 29a is updated in such a way that the intervals are fixed, as shown in FIG. 21. As a result, because the safety data processing unit 7 simply carries out the checking for update at any time during each interval (during one cycle) during which the notification memory 29a is updated, the safety data processing unit 7 can handle the safety data without causing a yet-to-be updated case and a multiple-times updated case even when each cycle of the safety data processing unit 7 is shorter.

INDUSTRIAL APPLICABILITY

Because the signal transmission device for elevator in accordance with the present invention can carry out continuous transmission of safety data independently of a process of handling the safety data, and can carry out the continuous transmission process of continuously transmitting the safety data at shorter time intervals as compared with conventional signal transmission devices and can transmit the safety data certainly even if the safety data need to have a shorter permissible response time, the signal transmission device in accordance with the present invention is suitable for a safety system for an elevator device or the like.

The invention claimed is:

1. A signal transmission device for elevator comprising:
a slave node to which information showing a state of a switch or a sensor concerning control of safety of an elevator is inputted; and
a master node that controls an operation of said elevator, in which one of said slave node and said master node transmits data about the safety of said elevator via a communication network and the other one of said slave node and said master node receives the data via the communication network, wherein
each of said slave node and said master node includes a safety data processing unit and a communication processing unit, and the safety data processing unit and the communication processing unit included in each node operate in parallel with each other,
said safety data processing unit in the slave node acquires said data about the safety at fixed time intervals and also adds an error detecting code which can achieve a predetermined rate of overlooking errors to create first data, and outputs the first data to said communication processing unit in the slave node,
said safety data processing unit in the master node checks whether or not said error detecting code of said first data outputted from said communication processing unit in the slave node is correct and analyzes a state concerning the safety of said elevator on a basis of said data about the safety acquired from the first data in which no error is detected, and
said communication processing unit in the slave node creates second data including said first data outputted from said safety data processing unit in the slave node, and transmits said second data via said communication network a predetermined number of times, and when properly receiving one or more pieces of said second data having a same content, said communication processing unit in the master node determines one of the one or more pieces of said second data as effective second data, and outputs the first data to said safety data processing unit in the master node, and wherein
the safety data processing unit in said master node stops the elevator when detecting an error from the error detecting code of the first data inputted from the communication processing unit in the master node or when said master node cannot receive said first data during a certain period of time.

2. The signal transmission device for elevator according to claim 1, wherein each of said safety data processing units has a plurality of operational circuits each carrying out a same safety data handling process, and compares input and output data and calculation results of the plurality of operational circuits with each other to diagnose soundness of the safety data or equipment.

3. The signal transmission device for elevator according to claim 1, wherein each of said communication processing units has a unit capable of specifying a number of times that continuous transmission is performed and carries out continuous transmission said specified number of times when transmitting said second data via said communication network.

4. The signal transmission device for elevator according to claim 1, wherein when plural pieces of said data about the safety are acquired by the safety data processing unit in the slave node, said safety data processing unit in the slave node adds an error detecting code and a running number to each of the two or more pieces of said data about the safety, and said signal transmission device further comprises:
a transmission data coupling unit that creates, as said first data, information by coupling said plural pieces of said data to each of which said error detecting code and said running number are added.

5. The signal transmission device for elevator according to claim 4, further comprising:
a number-of-transmission-data control unit that controls a number of transmission data in such a way that a number of the plural pieces of said data which are coupled into said first data becomes equal to or smaller than a packet size of any of said communication processing units.

6. The signal transmission device for elevator according to claim 5, wherein said number-of-transmission-data control unit includes a priority control unit that determines a frequency with which information is delivered to a communication layer according to a type of the information.

7. The signal transmission device for elevator according to claim 1, wherein when plural pieces of said data about the safety are acquired by the safety data processing unit in the slave node, said safety data processing unit in the slave node adds an error detecting code and a running number to each of said plural pieces of said data about the safety to create plural pieces of said first data by using said safety data processing unit, and also outputs said plural pieces of said first data to said communication processing unit in the slave node, and wherein said signal transmission device includes an output complete notifying unit that notifies completion of output to said communication processing unit in the slave node after outputting all data to be transmitted during a cycle, and said communication processing unit in the slave node includes a transmission data coupling unit that couples said plural pieces of said first data, and a transmission control unit that creates said second data from said coupled pieces of data and transmits said second data at a time when receiving the notification of the completion of output from said output complete notifying unit of said safety data processing unit in the slave node.

8. The signal transmission device for elevator according to claim 7, further comprising:
a number-of-transmission-data control unit that controls a number of data which at least one safety data processing unit delivers to at least one communication processing unit until notifying the completion of output in such a way that the number of data becomes equal to or smaller than a packet size of any of said communication processing units.

9. The signal transmission device for elevator according to claim 8, wherein said number-of-transmission-data control unit includes a priority control unit that determines a frequency with which information is delivered to a communication layer according to a type of the information.

10. The signal transmission device for elevator according to claim 1, further comprising:
a notification memory that notifies data which at least one communication processing unit has properly received, to at least one safety data processing unit, and a communication memory update managing unit that updates said notification memory after completion of an execution cycle of said at least one safety data processing unit after a last update of said notification memory.

11. The signal transmission device for elevator according to claim 1, further comprising:
a continuous transmission processing unit that makes a request of at least one communication processing unit to transmit the first data created by the safety data processing unit a predetermined number of times; and
a continuous transmission checking unit that, when at least one communication processing unit has properly received the second data said predetermined number of times, and all the first data which are acquired from the plural second data have same contents, determines that said first data are effective data, and analyzes a state concerning safety of an elevator on a basis of data about the safety acquired from the first data which are determined to be effective by said continuous transmission checking unit.

12. The signal transmission device for elevator according to claim 1, wherein the safety data processing unit of the slave node stops the output of said data about the safety when detecting an error from the error detecting code of the first data inputted from the communication processing unit of the master node or when said slave node cannot receive said first data during a certain period of time.

13. The signal transmission device for elevator according to claim 1, wherein each safety data processing unit and each communication processing unit has a different arithmetic operation unit that performs a process of handling the data about the safety of said elevator.

14. The signal transmission device for elevator according to claim 1, wherein the communication processing unit in the slave node adds a packet number and a second error detecting code to the first data when creating the second data.

\* \* \* \* \*